United States Patent
Ijeri et al.

(10) Patent No.: US 10,421,869 B2
(45) Date of Patent: Sep. 24, 2019

(54) SOL-GEL COATING COMPOSITIONS INCLUDING CORROSION INHIBITOR-ENCAPSULATED LAYERED METAL PHOSPHATES AND RELATED PROCESSES

(71) Applicant: The Boeing Company, Chicago, IL (US)

(72) Inventors: Vijaykumar S. Ijeri, Bangalore (IN); Om Prakash, Bangalore (IN); Stephen P. Gaydos, St. Louis, MO (US); Raghavan Subasri, Hyderabad (IN); Kalidindi Ramachandra Soma Raju, Hyderabad (IN); Dendi Sreenivas Reddy, Hyderabad (IN)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 15/431,506

(22) Filed: Feb. 13, 2017

(65) Prior Publication Data
US 2018/0194949 A1    Jul. 12, 2018

Related U.S. Application Data

(60) Provisional application No. 62/444,203, filed on Jan. 9, 2017.

(51) Int. Cl.
*C09D 5/08* (2006.01)
*C09D 7/65* (2018.01)
(Continued)

(52) U.S. Cl.
CPC .............. *C09D 5/08* (2013.01); *C09D 5/106* (2013.01); *C09D 7/65* (2018.01); *C09D 7/80* (2018.01);
(Continued)

(58) Field of Classification Search
CPC .......... C09D 5/084; C09D 5/08; C09D 5/106; C09D 7/65; C09D 7/80; C09D 183/08
See application file for complete search history.

(56) References Cited

U.S. PATENT DOCUMENTS 4,753,827 A    6/1988    Yoldas et al.
4,754,012 A    6/1988    Yoldas et al.
(Continued)

FOREIGN PATENT DOCUMENTS

DE    19718891    11/1998
DE    102009001372    9/2010
(Continued)

OTHER PUBLICATIONS

English Machine Translation of Japanese Patent No. JP 2986962 B2 (Year: 1999).*
(Continued)

*Primary Examiner* — Michael P Wieczorek
(74) *Attorney, Agent, or Firm* — Haynes and Boone, LLP

(57) ABSTRACT

A layered tetravalent metal phosphate composition (e.g., a layered zirconium phosphate composition) and a first corrosion inhibitor (e.g., cerium (III), a vanadate, a molybdate, a tungstate, a manganous, a manganate, a permanganate, an aluminate, a phosphonate, a thiazole, a triazole, and/or an imidazole) is dispersed in an aqueous solution and stirred to form a first solution. A precipitate of the first solution is collected and washed to form a first corrosion inhibiting material (CIM), which includes the first corrosion inhibitor intercalated in the layered tetravalent metal phosphate composition. The first CIM is added to a first sol-gel composition to form a first CIM-containing sol-gel composition. The first CIM-containing sol-gel composition is applied on a substrate to form a CIM-containing sol-gel layer, cured by UV radiation, and thermally cured to form a corrosion-resistant coating. One or more additional sol-gel composition may be applied on the substrate.

15 Claims, 12 Drawing Sheets

(51) Int. Cl.

| | | |
|---|---|---|
| *C09D 7/80* | (2018.01) | |
| *C09D 5/10* | (2006.01) | |
| *C09D 183/08* | (2006.01) | |
| *C23C 18/12* | (2006.01) | |
| *C08K 3/18* | (2006.01) | |
| *C08K 3/28* | (2006.01) | |
| *C08K 3/32* | (2006.01) | |

(52) U.S. Cl.
CPC .......... *C09D 183/08* (2013.01); *C23C 18/122* (2013.01); *C23C 18/1216* (2013.01); *C23C 18/1225* (2013.01); *C23C 18/1254* (2013.01); *C08K 3/18* (2013.01); *C08K 3/28* (2013.01); *C08K 3/32* (2013.01); *C08K 2003/328* (2013.01); *C23C 2222/20* (2013.01)

(56) References Cited

U.S. PATENT DOCUMENTS

| | | | |
|---|---|---|---|
| 4,814,017 | A | 3/1989 | Yoldas et al. |
| 5,328,975 | A | 7/1994 | Hanson et al. |
| 5,482,544 | A * | 1/1996 | Okuda .............. C09D 5/084 |
| | | | 106/14.05 |
| 5,939,197 | A | 8/1999 | Blohowiak et al. |
| 5,958,578 | A | 9/1999 | Blohowiak et al. |
| 6,037,060 | A | 3/2000 | Blohowiak et al. |
| 6,077,885 | A | 6/2000 | Hager et al. |
| 6,150,033 | A | 11/2000 | Mosser et al. |
| 6,169,119 | B1 | 1/2001 | Ryang et al. |
| 6,579,472 | B2 | 6/2003 | Chung et al. |
| 6,605,365 | B1 | 8/2003 | Krienke et al. |
| 7,052,592 | B2 | 5/2006 | Edigaryan |
| 8,592,042 | B2 | 11/2013 | Blohowiak et al. |
| 9,670,376 | B1 * | 6/2017 | Dawley .............. C09D 151/10 |
| 2001/0047665 | A1 | 12/2001 | Zhang et al. |
| 2002/0165339 | A1 | 11/2002 | Zha et al. |
| 2003/0024432 | A1 | 2/2003 | Chung et al. |
| 2003/0144469 | A1 | 7/2003 | Kauffman et al. |
| 2004/0024835 | A1 | 2/2004 | Howard |
| 2004/0107989 | A1 | 6/2004 | Woll et al. |
| 2005/0048298 | A1 | 3/2005 | Howell et al. |
| 2006/0009536 | A1 | 1/2006 | Jang et al. |
| 2006/0230476 | A1 | 10/2006 | Atanasoska et al. |
| 2007/0125451 | A1 | 6/2007 | Smith et al. |
| 2008/0058489 | A1 | 3/2008 | Edelmann et al. |
| 2008/0111027 | A1 | 5/2008 | Blohowiak et al. |
| 2008/0245260 | A1 | 10/2008 | Campazzi et al. |
| 2009/0078153 | A1 | 3/2009 | Shchukin et al. |
| 2009/0104362 | A1 | 4/2009 | Jang et al. |
| 2009/0148711 | A1 | 6/2009 | Le Blanc et al. |
| 2009/0186053 | A1 | 7/2009 | Meyer et al. |
| 2009/0192251 | A1 | 7/2009 | Chung et al. |
| 2009/0272293 | A1 | 11/2009 | Ono |
| 2010/0316447 | A1 | 12/2010 | Schmidt et al. |
| 2010/0330380 | A1 * | 12/2010 | Colreavy .............. C09C 1/64 |
| | | | 428/447 |
| 2011/0207049 | A1 | 8/2011 | Tillema et al. |
| 2011/0207206 | A1 | 8/2011 | Shelekhov |
| 2012/0298923 | A1 | 11/2012 | Lee et al. |
| 2013/0034702 | A1 | 2/2013 | Bockmeyer et al. |
| 2013/0145957 | A1 | 6/2013 | Shchukin et al. |
| 2014/0322540 | A1 | 10/2014 | Ferguson et al. |
| 2015/0079298 | A1 | 3/2015 | Ferreira et al. |
| 2015/0125690 | A1 | 5/2015 | Ryu et al. |
| 2015/0337171 | A1 | 11/2015 | Melzer et al. |
| 2015/0376420 | A1 | 12/2015 | Hintze-Bruning et al. |
| 2016/0089334 | A1 | 3/2016 | Nakayama et al. |
| 2017/0009034 | A1 | 1/2017 | Suzuki et al. |
| 2017/0020331 | A1 | 1/2017 | Berrux |
| 2018/0022936 | A1 | 1/2018 | Ijeri et al. |
| 2018/0022937 | A1 | 1/2018 | Ijeri et al. |
| 2018/0022938 | A1 | 1/2018 | Ijeri et al. |

FOREIGN PATENT DOCUMENTS

| | | |
|---|---|---|
| EP | 0263428 | 4/1988 |
| EP | 2011899 | 1/2009 |
| EP | 2743377 | 6/2014 |
| IE | 20080941 A1 | 9/2009 |
| JP | 2986962 B2 * | 12/1999 |
| JP | 2986962 B2 | 12/1999 |
| JP | 2004099943 | 4/2004 |
| WO | WO 2004/024835 | 3/2004 |
| WO | WO 2014/188390 | 11/2014 |

OTHER PUBLICATIONS

"Addressing Chemicals of Concern," European Chemicals Agency (ECHA), retrieved at http://echa.europa.eu/addressing-chemicals-of-concern, Jun. 22, 2012, 1 page.

"Authorisation List," European Chemicals Agency (ECHA), retrieved at http://echa.europa.eu/addressing-chemicals-of-concern/authorisation/recommendation-for-inclusion-in-the-authorisation-list/authorisation-list, Jun. 23, 2012, 3 pages.

"Hexavalent Chromium," OSHA, retrieved at https://www.osha.gov/SLTC/hexavalentchromium/, Jan. 2, 2004, 2 pages.

Yasakau et al., "Active Corrosion Protection by Nanoparticles and Conversion Films of Layered Double Hydroxides," Proceedings of the Corrosion 2013 Research Topical Symposium: Functionalized Coatings for Durable Materials and Interfaces, May 2014, pp. 436-445, vol. 70—No. 5, NACE International, Houston, Texas, USA.

Yasakau et al., "Mechanism of Corrosion Inhibition of AA2024 by Rare-Earth Compounds," Journal of Physical Chemistry B, Feb. 17, 2006, pp. 5515-5528, vol. 110—No. 11, American Chemical Society, Washington, DC, USA.

Poznyak et al., "Novel Inorganic Host Layered Double Hydroxides Intercalated with Guest Organic Inhibitors for Anticorrosion Applications," Applied Materials & Interfaces, Oct. 12, 2009, pp. 2353-2362, vol. 1—No. 10, American Chemical Society, Washington, DC, USA.

Wang et al., "A room temperature cured sol-gel anticorrosion pre-treatment for Al 2024-T3 alloys," Corrosion Science, Dec. 2007, pp. 4491-4503, vol. 49—No. 12, Elsevier Ltd., London, England.

Zhong et al., "Self-repairing vanadium-zirconium composite conversion coating for aluminum alloys," Applied Surface Science, Sep. 1, 2013, pp. 489-493, vol. 280, Elsevier B.V., Amsterdam, Netherlands.

Mei et al., "Effects of cerium salts on corrosion behaviors of Si—Zr hybrid sol-gel coatings," Chinese Journal of Aeronautics, Feb. 21, 2015, pp. 600-608, vol. 28 No. 2, Elsevier Ltd., London, England.

Yang et al., "Structure and synergetic antibacterial effect of zinc and cerium carried sodium zirconium phosphates," Journal of Rare Earths, Apr. 1, 2011, pp. 308-312, vol. 29—No. 4, Elsevier, Amsterdam, Netherlands.

Shida et al., "Zirconium-phosphate films self-assembled on aluminum substrate toward corrosion protection," Surface and Coatings Technology, Jun. 2, 2003, pp. 686-690, vol. 169-170, Elsevier Science B.V., Amsterdam, Netherlands.

Adhikari et al., "Hexafluorozirconic acid based surface pretreatments: Characterization and performance assessment," Electrochimica Acta, Jan. 15, 2011, pp. 1912-1924, vol. 56—No. 4, Elsevier Ltd., London, England.

Alhendawi et al., "New soft porous frameworks based on lambda-zirconium phosphate and aliphatic dicarboxylates: Synthesis and structural characterization," Journal of Physical and Chemistry of Solids, Nov. 2015, pp. 95-100, vol. 86, Elsevier Ltd., London, England.

Cerezo et al., "The effect of surface pre-conditioning treatments on the local composition of Zr-based conversion coatings formed on aluminium alloys," Applied Surface Science, Mar. 15, 2016, pp. 339-347, vol. 366, Elsevier B.V., Amsterdam, Netherlands.

(56) References Cited

OTHER PUBLICATIONS

Alibakhshi et al., "Fabrication and Characterization of PO43-Intercalated Zn-Al-Layered Double Hydroxide Nanocontainer", Jan. 1, 2016, pp. C495-C505, vol. 163, No. 8, Journal of the Electrochemical Society, Pennington, New Jersey.

Shkirskiy et al., "Factors Affecting MoO42-Inhibitor Release from Zn2Al Based Layered Double Hydroxide and Their Implication in Protecting Hot Dip Galvanized Steel by Means of Organic Coatings", Nov. 3, 2015, pp. 25180-25192, vol. 7, No. 45, ACS Applied Materials & Interfaces, Washington, D.C.

Versace et al., "Influence of zirconium propoxide on the radical induced photopolymerisation of hybrid sol-gel material", First published as an Advance Article on the web Sep. 18, 2008, DOI: 10.1039/b806056h, vol. 32, pp. 2270-2278, New Journal of Chemistry.

Zheludkevich et al., "Active protection coatings with layered double hydroxide nanocontainers of corrosion inhibitor", Feb. 1, 2010, pp. 602-611, vol. 52, No. 2, Corrosion Science, Oxford, GB.

\* cited by examiner

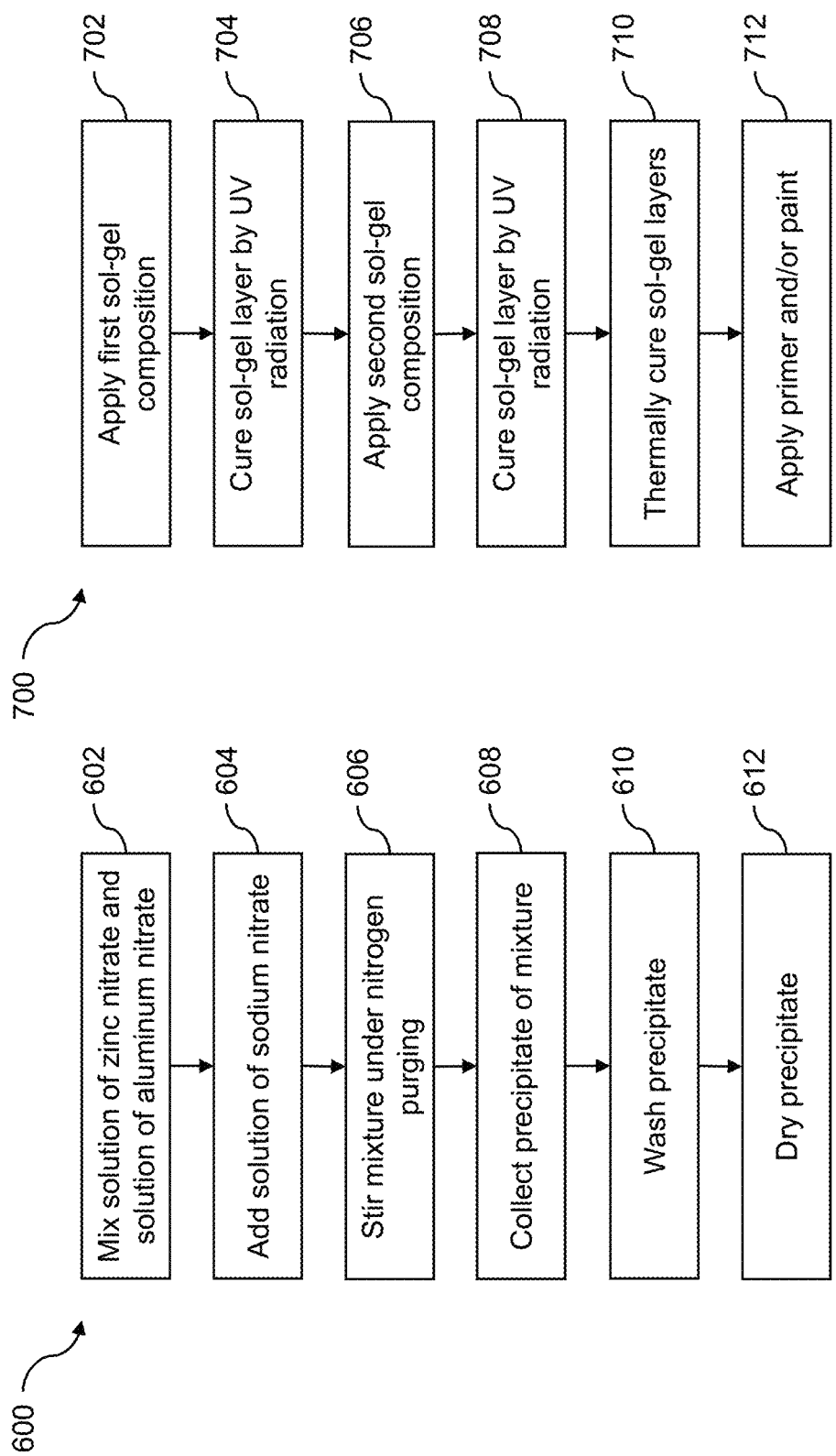

| Sol-gel with CI intercalated in LDH 804 | Sol-gel with CI intercalated in Zr-P 802 |
|---|---|
| Al substrate 800 | |

FIG. 8A

| Sol-gel with CI intercalated in Zr-P 814 | Sol-gel with CI intercalated in LDH 812 |
|---|---|
| Al substrate 810 | |

FIG. 8B

| Sol-gel with CI intercalated in Zr-P 824 | Sol-gel with CI intercalated in Zr-P 822 |
|---|---|
| Al substrate 820 | |

FIG. 8C

| Sol-gel with CI intercalated in Zr-P 834 | Sol-gel without CI 832 |
|---|---|
| Al substrate 830 | |

FIG. 8D

| Sol-gel without CI 844 | Sol-gel with CI intercalated in Zr-P 842 |
|---|---|
| Al substrate 840 | |

FIG. 8E

| Sol-gel without CI 856 | Sol-gel with CI intercalated in Zr-P 854 | Sol-gel without CI 852 |
|---|---|---|
| Al substrate 850 | | |

FIG. 8F

SOL-GEL COATING COMPOSITIONS INCLUDING CORROSION INHIBITOR-ENCAPSULATED LAYERED METAL PHOSPHATES AND RELATED PROCESSES

CROSS REFERENCE TO RELATED APPLICATION

This application claims the benefit of and priority to U.S. Provisional Application No. 62/444,203, filed on Jan. 9, 2017, which is hereby incorporated by reference in its entirety.

BACKGROUND

1. Technical Field

The present disclosure relates to coating compositions and processes and, more particularly, to sol-gel coating compositions including corrosion inhibitor-encapsulated layered metal phosphates and related processes.

2. Related Art

High strength alloys such as aluminum alloys are widely used in various industries such as the aerospace industry due to their high strength to weight ratio. However these alloys are prone to corrosion due to the presence of alloying materials.

In order to protect these alloys from the environment, a chrome conversion coating may be provided on a surface of an alloy followed by application of primer and a top coat. Although organic paint systems applied on the surface provide good barrier properties against corrosion, even small defects formed in the organic paint provide pathways for the ingress of electrolyte to the metallic surface, which initiates localized corrosion. Therefore, chromium-based conversion coatings have been used in anti-corrosion pre-treatments before application of organic coatings. However, hexavalent chromium compounds have harmful effects.

Thus, there is a need for coating compositions and processes that are chromium-free while providing a coating that is corrosion-resistant.

SUMMARY

In accordance with embodiments of the present disclosure, various methods and formulations are provided relating to sol-gel coating of substrates (e.g., an aluminum substrate, an aluminum alloy substrate or other substrate). A sol-gel layer formed on a substrate advantageously provides corrosion protection. Further, the sol-gel layer advantageously provides enhanced adhesion between the substrate and a paint system (e.g., primer and paint).

In one aspect, a method includes dispersing a layered tetravalent metal phosphate composition (e.g., a layered zirconium phosphate composition) and a first corrosion inhibitor (CI) (e.g., cerium (III), a vanadate, a molybdate, a tungstate, a manganous, a manganate, a permanganate, an aluminate, a phosphonate, a thiazole, a triazole, and/or an imidazole) in an aqueous solution and stirring to form a first solution, collecting a precipitate of the first solution, and washing the precipitate of the first solution to form a first corrosion inhibiting material (CIM). The first CIM includes the first corrosion inhibitor intercalated in the layered tetravalent metal phosphate composition.

In another aspect, the method further includes adding the first CIM to a first sol-gel composition to form a first CIM-containing sol-gel composition. In another aspect, the method further includes applying the first CIM-containing sol-gel composition on a substrate to form a CIM-containing sol-gel layer, curing the CIM-containing sol-gel layer by UV radiation, and thermally curing the CIM-containing sol-gel layer to form a corrosion-resistant coating.

In another aspect, the method further includes applying the first CIM-containing sol-gel composition on a substrate to form a first CIM-containing sol-gel layer, curing the first CIM-containing sol-gel layer by UV radiation, applying a second CIM-containing sol-gel composition on the substrate to form a second CIM-containing sol-gel layer, curing the second CIM-containing sol-gel layer by UV radiation, and thermally curing a plurality of sol-gel layers including the first CIM-containing sol-gel layer and the second CIM-containing sol-gel layer to form a corrosion-resistant coating. In some examples, the first CIM-containing sol-gel layer is applied before the second CIM-containing sol-gel layer is applied. In other examples, the first CIM-containing sol-gel composition is applied after the second CIM-containing sol-gel composition is applied. The second CIM-containing sol-gel composition is formed, for example, by dispersing a Zn—Al layered double hydroxide (LDH) composition and a second corrosion inhibitor in a solvent and stirring to form a second solution, collecting a precipitate of the second solution, washing the precipitate of the second solution to form a second CIM, and adding the second CIM to a second sol-gel composition to form the second CIM-containing sol-gel composition. The second CIM includes the second corrosion inhibitor intercalated in the Zn—Al LDH composition.

In an aspect, a first CIM includes a layered tetravalent metal phosphate composition including nanoparticles of layered tetravalent metal phosphate (e.g., layered zirconium phosphate), and a first corrosion inhibitor (e.g., cerium (III), a vanadate, a molybdate, a tungstate, a manganous, a manganate, a permanganate, an aluminate, a phosphonate, a thiazole, a triazole, and/or an imidazole). The first corrosion inhibitor is intercalated in the nanoparticles of layered tetravalent metal phosphate.

In another aspect, a first sol-gel composition includes the first CIM and a first polymer composite of one or more alkoxysilanes, a zirconium alkoxide, and an organic acid. In yet another aspect, a corrosion-resistant coated product includes a first CIM-containing sol-gel layer including the first sol-gel composition. The second CIM includes, for example, a Zn—Al LDH composition including nanoparticles of Zn—Al LDH and a second corrosion inhibitor intercalated in the nanoparticles of the Zn—Al LDH.

The scope of the invention is defined by the claims, which are incorporated into this section by reference. A better understanding of the methods and formulations for sol-gel coating of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which, like reference numerals are used to identify like ones of the elements illustrated therein.

BRIEF DESCRIPTION OF THE DRAWINGS

FIG. 6 illustrates an example process for preparing a Zn—Al layered double hydroxide (LDH) composition in accordance with an embodiment of the present disclosure.

FIG. 7 illustrates an example process for forming a corrosion-resistant coating that includes one or more sol-gel layers on a substrate in accordance with an embodiment of the present disclosure.

FIGS. 8A-F illustrate diagrammatic cross-sectional views of example corrosion-resistant coatings that include a plurality of sol-gel layers formed on substrates in accordance with embodiments of the present disclosure.

DETAILED DESCRIPTION

Figure 1:
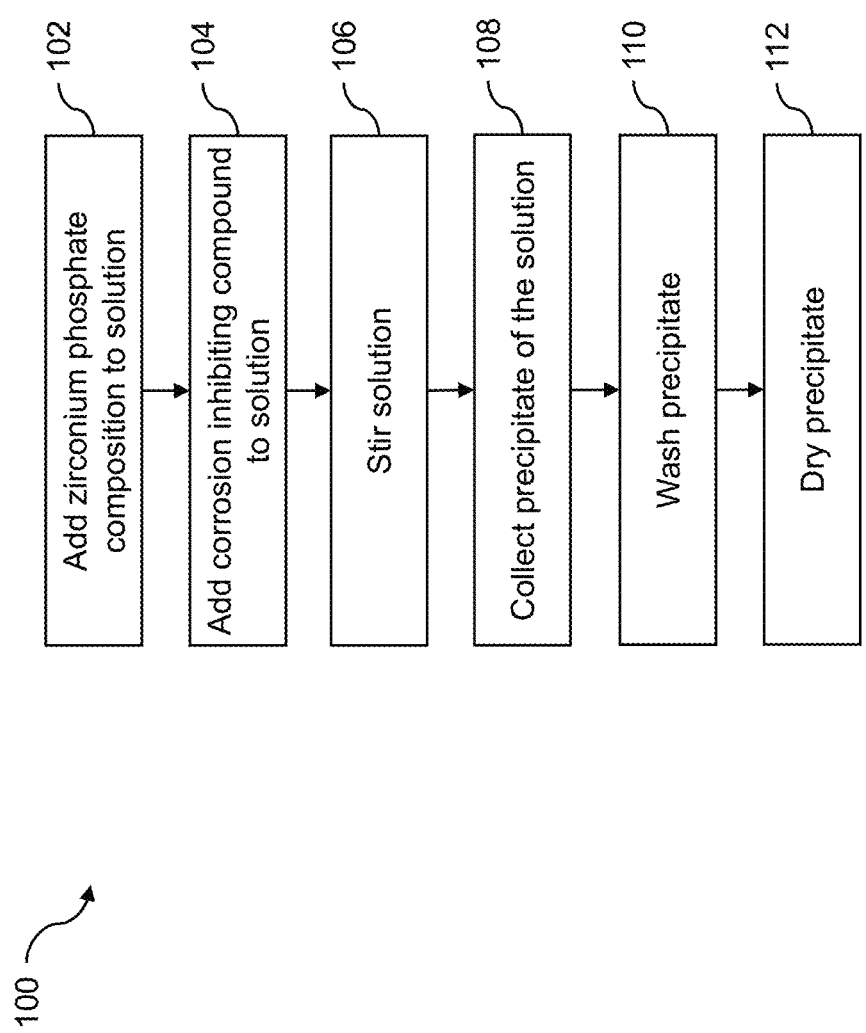
FIG. 1 illustrates an example process for preparing a first corrosion inhibiting material in accordance with an embodiment of the present disclosure.

The following description is merely exemplary in nature and is not intended to limit the present disclosure, application, or uses.

The terms "substituent", "radical", "group", "moiety," and "fragment" may be used interchangeably.

Singular forms "a" and "an" may include plural reference unless the context clearly dictates otherwise.

The number of carbon atoms in a substituent can be indicated by the prefix "$C_{A-B}$" where A is the minimum and B is the maximum number of carbon atoms in the substituent.

The term "alkyl" embraces a linear or branched acyclic alkyl radical containing from 1 to about 15 carbon atoms. In some embodiments, alkyl is a $C_{1-10}$ alkyl, $C_{1-6}$ alkyl, or $C_{1-3}$ alkyl radical. Examples of alkyl include, but are not limited to, methyl, ethyl, propyl, isopropyl, butyl, isobutyl, tert-butyl, sec-butyl, pentan-3-yl (i.e.,

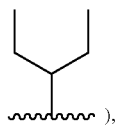

), and the like.

The term "alkoxy" is RO— where R is alkyl. Non-limiting examples of alkoxy include methoxy, ethoxy, propoxy, n-butyloxy, and tert-butyloxy. The terms "alkyloxy", "alkoxy," and "alkyl-O—" may be used interchangeably.

The term "methacryl" is

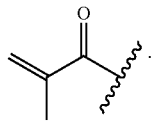 [SMILES: *C(=O)C(=C)C]

The term "methacryloxy" is

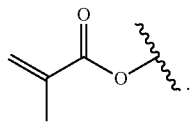 [SMILES: *OC(=O)C(=C)C]

The term "methacryloxyalkyl" embraces alkyl substituted with methacryloxy. Non-limiting examples of methacryloxyalkyl include methacryloxyethyl, methacryloxypropyl, and methacryloxybutyl.

The term "glycidyl" is

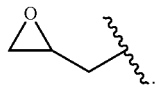

The term "glycidyloxy" is

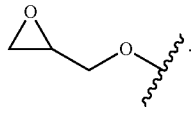 [SMILES: *OCC1CO1]

The terms "glycidyloxy" and "glycidoxy" may be used interchangeably.

The term "glycidoxyalkyl" embraces alkyl substituted with glycidoxy. Non-limiting examples of glycidoxyalkyl include, glycidoxyethyl, and glycidoxypropyl, and glycidoxybutyl. The terms "glycidyloxyalkyl" and "glycidoxyalkyl" may be used interchangeably.

The term "aminoalkyl" embraces an amino radical attached to a parent molecular scaffold through an alkyl radical (e.g., $NH_2$-alkyl-scaffold).

The term "aryl" refers to any monocyclic, bicyclic, or tricyclic cyclized carbon radical, wherein at least one ring is aromatic. An aromatic radical may be fused to a non-aromatic cycloalkyl or heterocyclyl radical. Aryl may be substituted or unsubstituted. Examples of aryl include phenyl and naphthyl.

The term "aralkyl" embraces aryl attached to a parent molecular scaffold through alkyl and may be used interchangeably with the term "arylalkyl." Examples of aralkyl include benzyl, diphenylmethyl, triphenylmethyl, phenylethyl, and diphenylethyl. The terms "benzyl" and "phenylmethyl" may be used interchangeably.

The term "silane" is a compound containing silicon.

The term "organosilane" is a silane having at least one silicon to carbon bond.

The term "alkoxysilane" is a silane having at least one silicon to alkoxy bond.

The term "organoalkoxysilane" is a silane having at least one silicon to carbon bond and at least one silicon to alkoxy bond.

The term "about," as used herein when referring to a measurable value such as an amount, concentration, time and the like, is meant to encompass variations of ±20%, ±10%, ±5%, ±1%, ±0.5%, or even ±0.1% of the specified value.

Compositions and processes relating to sol-gel coating of substrates such as metal or metal alloy substrates (e.g., aluminum substrates, aluminum alloy substrates or other substrates) are provided. Sol-gel coating may be used as a chrome-free pretreatment on substrates prior to the application of organic coatings such as primer and paint. The pretreatment may be performed by applying a layer of a sol-gel composition that includes a corrosion inhibiting material (CIM). The sol-gel composition is obtained as a product of hydrolysis and condensation of a mixture of organosilanes and a metal alkoxide, along with a corrosion inhibitor (CI) (e.g., a corrosion inhibiting compound or a corrosion inhibiting element) encapsulated (e.g., intercalated) in nanoparticles (also referred to as nanocarriers or nanocontainers) made up of layered metal phosphates. Nanoparticles have a size ranging from about 1 nm to about 1000 nm (e.g., a size ranging from about 1 nm to about 200 nm, a size ranging from about 1 nm to about 100 nm, or other size range). Ultraviolet (UV) radiation is used to densify the sol-gel layer in addition to, or instead of, thermal curing the sol-gel layer. Thermal curing may include exposing the sol-gel layer to a high temperature (e.g., in a hot air circulated oven). Alternatively, or in addition, thermal curing may include exposing the sol-gel layer to infrared (IR) radiation or near IR radiation, which reduces curing time. Advantageously, the sol-gel coating composition may be low temperature curable, provide excellent barrier protection, and possess self-healing properties to provide prolonged corrosion protection. Further, the sol-gel layers formed using the sol-gel coating composition may release corrosion inhibitors on demand.

FIG. 1 illustrates an example process 100 for preparing a corrosion inhibiting material. The corrosion inhibiting material includes a layered metal phosphate (e.g., a layered zirconium phosphate) encapsulating one or more corrosion inhibitors. The corrosion inhibiting material may be an organic corrosion inhibiting material that includes one or more organic corrosion inhibitors, an inorganic corrosion inhibiting material that includes one or more organic corrosion inhibitors, or a combination corrosion inhibiting material that includes one or more organic corrosion inhibitors and one or more inorganic corrosion inhibitors.

At block 102, a layered metal phosphate composition (e.g., a layered tetravalent metal phosphate composition) is added to a solution. For example, the layered tetravalent metal phosphate composition in an amount ranging from about 1 to about 100 g per 1 L of the solution is added to the solution. The amount of the layered tetravalent metal phosphate may be 1, 5, 10, 15, 20, 25, 30, 35, 40, 45, 50, 55, 60, 65, 70, 75, 80, 85, 90, 95, or 100 g per 1 L of the solution, where any value may form an upper end point or a lower end point, as appropriate.

In an aspect, the layered tetravalent metal phosphate composition is a layered zirconium phosphate composition of Formula I:

$$Zr(HPO_4)_2 \cdot nH_2O \qquad \text{Formula I}$$

In another aspect, the layered tetravalent metal phosphate composition is an α-Zirconium phosphate composition of Formula II;

$$Zr(HPO_4)_2 \cdot H_2O \qquad \text{Formula II}$$

The layered α-zirconium phosphate composition may be formed, for example, by mixing a zirconyl chloride solution and a phosphoric acid solution to form a mixture, collecting a precipitate of the mixture, and then washing and drying the precipitate that includes the layered α-zirconium phosphate composition.

In yet another aspect, the layered tetravalent metal phosphate composition is a α-Ziconium phosphate composition of Formula III:

$$Zr(PO_4)(H_2PO_4) \cdot 2H_2O \qquad \text{Formula III}$$

At block 104, a corrosion inhibitor is added to the solution. The corrosion inhibitor includes an inorganic corrosion inhibitor, an organic corrosion inhibitor, or both. For example, the corrosion inhibitor in an amount that is about equimolar to the layered tetravalent phosphate composition is added to the solution.

In an aspect, the organic corrosion inhibitor is an imidazole, a triazole, a tetrazole, a thiazole, a thiadiazole, a benzimidazole, a benzotriazole, a benzothiazole, a quinoline, phytic acid, a phosphonate, an organophosphonic acid, or an oil. The oil includes saturated and/or unsaturated fatty acids such as stearic acid, palmitic acid, oleic acid, linoleic acid, and/or linolenic acid.

Specific examples of the organic corrosion inhibitor include 1-(3-aminopropyl)imidazole, 1H-1,2,3-triazole, 4-methyl-4H-1,2,4-triazole-3-thiol, 1,2,4-triazole-3-carboxylic acid, 3-amino-1,2,4-triazole-5-thiol, 4H-1,2,4-triazol-4-amine, 3-mercapto-4-methyl-4H-1,2,4-triazole, 5-phenyl-1H-1,2,4-triazole-3-thiol, 1-methyl-1H-tetrazole-5-thiol, 1H-tetrazole-5-acetic acid, 4-methyl-1,3-thiazole-5-carboxylic acid, 1,3,4-thiadiazole-2,5-dithiol, 1H-benzimidazole-2-carboxylic acid, 1H-benzotriazole (BTA), 2-mercaptobenzothiazole (MBT), 8-hydroxyquinoline, phytic acid, iminodimethylphosphonic acid, amino tris(methylenephosphonic acid) (ATMP), ethylenediamine tetra(methylenephosphonic acid) (EDTMP), 1-hydroxyethylidene-1,1-diphosphonic acid (HEDP), diethylenetriamine penta (methylenephosphonic acid) (DTPMP), and vegetable oil (e.g., linseed oil or other vegetable oil).

In an aspect, the inorganic corrosion inhibitor is a salt of an oxyanion of a transition metal, a post-transition metal, a metalloid, or a polyatomic non-metal. In another aspect, the inorganic corrosion inhibitor includes cerium (III), a vanadate, a molybdate, a tungstate, a phosphate, a manganous, a manganate, a permanganate, or an aluminate.

Specific examples of the inorganic corrosion inhibitor include sodium metavanadate, potassium permanganate, sodium molybdate, and sodium tungstate.

At block 106, the solution is stirred. Stirring may be performed for a time period ranging from 2 to about 48 h. The time period may be about 2, 4, 6, 8, 10, 12, 14, 16, 18, 20, 22, 24, 28, 32, 36, 40, 44, or 48 h, where any value may form an upper end point or a lower end point, as appropriate. A corrosion inhibitor-encapsulated layered tetravalent metal phosphate is formed as a result of block 106. The layered tetravalent metal phosphate composition and the corrosion inhibitor are dispersed in the solution, and the layered tetravalent metal phosphate composition is intercalated with the corrosion inhibitor such that the layered tetravalent metal phosphate composition functions as nanocontainers that encapsulate the corrosion inhibitor.

At block 108, a precipitate of the solution is collected, for example, by centrifugation. The precipitate is washed at block 110 and dried at block 112 to form the corrosion inhibiting material. For example, the precipitate is washed one or more times with water until the pH of the supernatant is neutral, and then dried in a drying oven. The corrosion inhibiting material includes a corrosion inhibitor-containing layered tetravalent metal phosphate composition (also referred to as a corrosion inhibitor-incorporated layered tetravalent metal phosphate composition, a corrosion inhibitor-intercalated layered tetravalent metal phosphate composition, or a corrosion inhibitor-encapsulated layered tetravalent metal phosphate composition).

If an organic corrosion inhibitor is used in block 104, the corrosion inhibiting material is an organic corrosion inhibiting material that includes the organic corrosion inhibitor encapsulated in the layered tetravalent metal phosphate composition. If an inorganic corrosion inhibitor is used in block 104, the corrosion inhibiting material is an organic corrosion inhibiting material that includes the organic corrosion inhibitor encapsulated in the layered tetravalent metal phosphate composition. Accordingly, in embodiments in which both an inorganic corrosion inhibiting material and an organic corrosion inhibiting material are desired, process 100 may be performed twice, once using an organic corrosion inhibitor at block 104 and once using an inorganic corrosion inhibitor at block 104.

In some embodiments, a combination corrosion inhibiting material that includes the layered tetravalent metal phosphate composition encapsulating both an organic corrosion inhibitor and an inorganic corrosion inhibitor may be formed by mixing an organic corrosion inhibiting material and an inorganic corrosion inhibitor each prepared by respective process 100, or by preparing a solution including both types of corrosion inhibitors at block 104 in one process 100.

Blocks 102-112 may be performed in the order presented or in a different order and/or one or more blocks may be omitted in some embodiments. For example, block 102 may be performed before, after, or simultaneously with block 104. Further, in another embodiment, the compounds of blocks 102 and 104 are dispersed in separate solutions and then combined.

Figure 2:
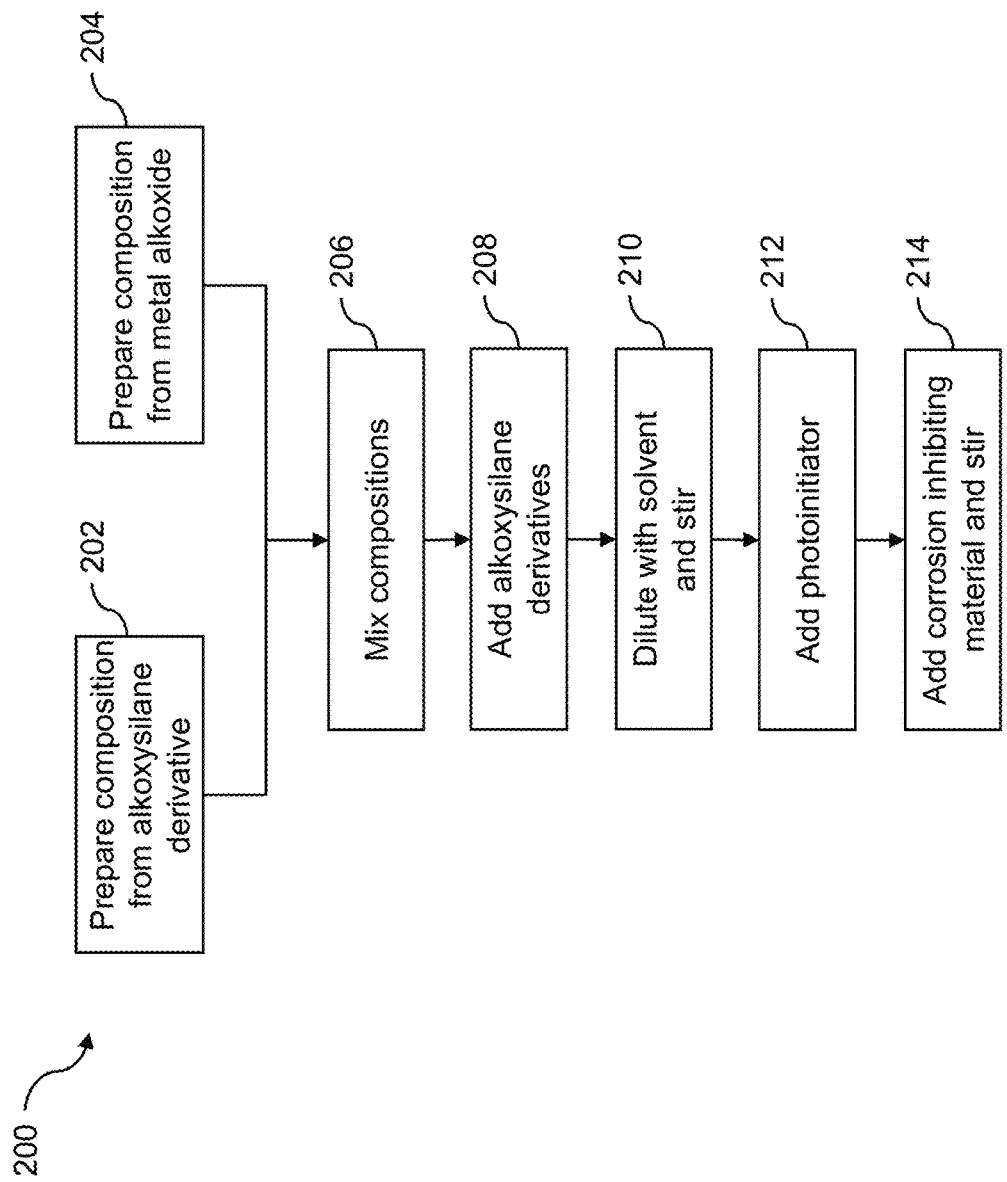
FIG. 2 illustrates an example process for preparing a sol-gel composition in accordance with an embodiment of the present disclosure.

FIG. 2 illustrates an example process 200 for preparing a sol-gel composition. A low temperature curable matrix sol is synthesized in two parts (Composition A and Composition B), the two parts are mixed together, additional compounds are added and stirred, and a corrosion inhibiting material is added to obtain a sol-gel composition.

At block 202, Composition A is prepared from an alkoxysilane such as an organoalkoxysilane. An alkoxysilane is contacted with water and an inorganic acid (e.g., HCl, HNO$_3$, H$_3$PO$_4$, or other inorganic acid) to form Composition A.

For example, an alkoxysilane is mixed with water and stirred, and an inorganic acid is added to the solution of the alkoxysilane and water and stirred in an ice bath until the solution turns transparent. The ratio of the number of moles of the alkoxysilane (which is equal to the number of moles of silicon from the alkoxysilane) to the number of moles of water ($n_{Si}/n_{water}$) in Composition A ranges from about 0.5 to about 2. The ratio may be, for example, about 0.5, 0.6, 0.7, 0.8, 0.9, 1.0, 1.1, 1.2, 1.3, 1.4, 1.5, 1.6, 1.7, 1.8, 1.9, or 2.0, where any value may form an upper end point or a lower end point, as appropriate.

In an aspect, an alkoxysilane of Formula IV is used as Precursor A:

Formula IV wherein;
$R_A$ is methacryloxyalkyl or glycidoxyalkyl; and
$R_B$ is alkoxy.

In another aspect, $R_A$ is methacryloxyalkyl (e.g., methacryloxymethyl, methacryloxyethyl, methacryloxypropyl, methacryloxybutyl, or other methacryloxyalkyl) or glycidoxyalkyl (e.g., glycidoxymethyl, glycidoxyethyl, glycidoxypropyl, glycidoxybutyl); and each $R_B$ is independently alkoxy (e.g., methoxy, ethoxy, propoxy).

Specific examples of $R_A$—Si—($R_B$)$_3$ include 3-methacryloxypropyltrimethoxysilane, 3-methacryloxypropyltriethoxysilane, 3-glycidyloxypropyltrimethoxysilane, and 3-glycidoxypropylethoxysilane.

In some aspects, an alkoxysilane used as Precursor A of a sol-gel composition includes methacryloxyalkyl alkoxysilane (an alkoxysilane of Formula IV in which $R_A$ is methacryloxyalkyl) and/or a glycidoxyalkyl alkoxysilane (an alkoxysilane of Formula IV in which the $R_A$ is glycidoxyalkyl). The methacryloxyalkyl alkoxysilane and/or the glycidoxyalkyl alkoxysilane are used, for example, to facilitate polymerization of the sol-gel composition when exposed to UV radiation.

At block 204, Composition B is prepared from a transition metal alkoxide such as a zirconium alkoxide. A zirconium alkoxide is contacted with an organic acid such as a carboxylic acid (e.g., acrylic acid, methacrylic acid (MAA), ethacrylic acid, crotonic acid, itaconic acid, maleic acid, fumeric acid, or other carboxylic acid) to form Composition B.

For example, the zirconium alkoxide is mixed with methacrylic acid and stirred. The ratio of the number of moles of the zirconium alkoxide (which is equal to the number of moles of zirconium from the zirconium alkoxide) to the ratio of the number of moles of methacrylic acid (($n_{Zr}/n_{MAA}$) ranges from about 0.5 to about 2. The ratio may be, for example, about 0.5, 0.6, 0.7, 0.8, 0.9, 1.0, 1.1, 1.2, 1.3, 1.4, 1.5, 1.6, 1.7, 1.8, 1.9, or 2.0, where any value may form an upper end point or a lower end point, as appropriate.

In an aspect, a zirconium alkoxide of Formula V is used as Precursor B:

Formula V wherein;
$R_C$ is alkoxy.

In another aspect, each $R_C$ is independently alkoxy (methoxy, ethoxy, n-propoxy, isopropoxy, n-butoxy, tert-butoxy, or other alkoxy).

Specific examples of Zr—($R_C$)$_4$ include zirconium ethoxide, zirconium n-propoxide, zirconium isopropoxide, zirconium n-butoxide, and zirconium tert-butoxide.

In some aspects, a zirconium alkoxide is used as Precursor B of a sol-gel composition, for example, to match the coefficient of thermal expansion of the sol-gel composition with a substrate. The zirconium alkoxide may be used in an amount such that the coefficient of the thermal expansion of the sol-gel composition is equal to or about the coefficient of thermal expansion of the substrate.

At block 206, Composition A and Composition B are mixed together. For example, Composition B is added to Composition A under stirring to avoid agglomeration, and the mixture of Composition A and Composition B is stirred in an ice bath and then stirred at room temperature so that the temperature of the mixture reaches room temperature.

At block 208, one or more alkoxysilanes such as one or more organoalkoxysilanes are added to the mixture of Composition A and Composition B. One or more alkoxysilanes and an organic acid such as a carboxylic acid (e.g., acrylic acid, methacrylic acid, ethacrylic acid, crotonic acid, itaconic acid, maleic acid, fumeric acid, or other carboxylic acid) are contacted with the mixture of Composition A and Composition B to form a sol-gel composition.

For example, each of one or more alkoxysilanes are added to the mixture and stirred. Then, methacrylic acid is added to the resulting mixture and stirred. Optionally, an inorganic acid is added before, together with, or after the organic acid.

In an aspect, one or more alkoxysilane of Formula VI is used as Precursor C:

$$R_D-Si-(R_E)_3 \qquad \text{Formula VI}$$

wherein;
$R_D$ is aryl, aralkyl, glycidoxyalkyl, or aminoalkyl; and
$R_E$ is alkoxy.

In another aspect, $R_D$ is aryl (e.g., phenyl or other aryl), aralkyl (e.g., benzyl, phenylethyl, phenylpropyl, or other aralkyl), glycidoxyalkyl (e.g., glycidomethyl, glycidoxyethyl, glycidoxypropyl, glycidoxybutyl, or other glycidoxyalkyl), or aminoalkyl (e.g., aminomethyl, aminoethyl, aminopropyl, aminobutyl, or other aminoalkyl); and each $R_E$ is independently alkoxy (e.g., methoxy, ethoxy, propoxy).

Specific examples of $R_D-Si-(R_E)_3$ include phenyltrimethoxysilane, phenyltriethoxysilane, 3-glycidoxypropyltrimethoxysilane, 3-glycidoxypropyltriethoxysilane, 3-aminopropyltrimethoxysilane, and 3-aminopropyltriethoxysilane.

In some aspects, one or more alkoxysilanes used as Precursor C of a sol-gel composition include an aryl alkoxysilane (an alkoxysilane of Formula VI in which $R_D$ is aryl), a glycidyloxyalkyl alkoxysilane (an alkoxysilane of Formula VI in which $R_D$ is glycidoxyalkyl), and/or an aminoalkyl alkoxysilane (an alkoxysilane of Formula VI in which $R_D$ is aminoalkyl). The aryl alkoxysilane is used, for example, to improve the barrier properties of a coating formed from the sol-gel composition. The glycidyloxyalkyl alkoxysilane is used, for example, to generate a thick coating. The aminoalkyl alkoxysilane is used, for example, to improve the adhesion of the sol-gel composition to a substrate when deposited.

In an example, an aryl alkoxysilane is added to the mixture and stirred. Then, an aminoalkyl alkoxysilane is added to the mixture and stirred. Then, a glycidyloxyalkyl alkoxysilane is added to the mixture. Then, methacrylic acid is added and stirred. An inorganic acid may also be added. The order of the alkoxysilanes that are added may be changed in other examples.

The total amount of the alkoxysilanes, which includes the alkoxysilane used in block 202 and the one or more alkoxysilanes used in block 208, and the amount of the zirconium alkoxide used in block 204 are such that the sol-gel composition has a ratio of a number of moles of alkoxysilanes (which is equal to the number of moles of silicon from the alkoxysilanes) to a number of moles of zirconium alkoxide (which is equal to the number of moles of zirconium from the zirconium alkoxide) ($n_{Si}/n_{Zr}$) ranging from about 2 to about 10. The ratio of the number of moles of silicon to the number of moles of zirconium ($n_{Si}/n_{Zr}$) may be about 2, 3, 4, 5, 6, 7, 8, 9, or 10, where any value may form an upper end point or a lower end point, as appropriate.

In some examples, one or more of the stirring performed in blocks 202, 204, 206, and/or 208 may be performed for a time period ranging from about 10 min to about 120 min. The stirring performed in blocks 202, 204, 206, and/or 208, may be performed for a time period of about 10, 20, 30, 40, 50, 60, 70, 80, 90, 100, 110, or 120 min, where any value may form an upper end point or a lower end point, as appropriate.

At block 210, the sol-gel composition is diluted with a solvent such as alcohol (e.g., isopropanol or other solvent) and stirred. The dilution of the sol-gel composition, the stirring to age the sol-gel composition, or both (e.g., block 210 entirely) may be omitted in some embodiments.

For example, the sol-gel composition is diluted with isopropanol in a weight ratio of about 1:1. The diluted sol-gel composition, or the sol-gel composition formed by block 308 if dilution is omitted, is stirred to age the sol-gel composition for a time period ranging from 1 to about 24 hours (h). The stirring to age the sol-gel composition may be performed for a time period of about 1, 2, 3, 4, 5, 6, 9, 12, 15, 18, 21, or 24 h, where any value may form an upper end point or a lower end point, as appropriate.

At block 212, a photoinitiator is added to the sol-gel composition formed by block 210 (or by block 208 for embodiments in which block 210 is omitted) and stirred.

For example, a photoinitiator in an amount ranging from about 0.5 to about 3 parts by weight per 100 parts by weight of the sol-gel composition (the weight of the sol-gel with the photoinitiator to be added or, alternatively, the weight of the sol-gel before adding the photoinitiator) is added, and the sol-gel composition with the photoinitiator is stirred. The amount of the photoinitiator may be about 0.5, 1, 1.5, 2, 2.5, or 3 parts by weight per 100 parts of the sol-gel composition, where any value may form an upper end point or a lower end point, as appropriate. The stirring may be performed for a time period ranging from about 10 to about 60 min. The stirring may be performed for a time period of about 10, 20, 30, 40, 50, or 60 min, where any value may form an upper end point or a lower end point, as appropriate. Once the photoinitiator is added, exposure of the sol-gel composition to light may be avoided by covering a container for the sol-gel composition (e.g., using aluminum foil) and/or storing in an amber-colored container.

At block 214, a corrosion inhibiting material is added to the sol-gel composition to form a CIM-containing sol-gel composition.

For example, a corrosion inhibiting material prepared by process 100 of FIG. 1 in an amount ranging from about 0.5 to about 10 parts by weight per 100 parts by weight of the sol-gel composition (the weight of the sol-gel with the corrosion inhibiting material to be added or, alternatively, the weight of the sol-gel before adding the corrosion inhibiting material) is added to the sol-gel composition and stirred to form a CIM-containing sol-gel composition. The amount of the corrosion inhibiting material may be about 0.5, 1, 1.5, 2, 2.5, 3, 4, 5, 6, 7, 8, 9, or 10 parts by weight per 100 parts by weight of the sol-gel composition, where any value may form an upper end point or a lower end point, as appropriate.

In another example, a corrosion inhibiting material in an amount of the sol-gel composition is an amount ranging from about 1 to about 10 parts by weight per 100 parts by weight of the solid content of the sol-gel composition is added to the sol-gel composition and stirred to form a CIM-containing sol-gel composition. The amount of the corrosion inhibiting material may be about 1, 2, 3, 4, 5, 6, 7, 8, 9, or 10 parts by weight per 100 parts by weight of the solid content of the sol-gel composition, where any value may form an upper end point or a lower end point, as appropriate. The sol-gel composition may have a solid content ranging from about 10 to about 70 parts by weight per 100 parts by weight of the sol-gel composition. The sol-gel composition may have a solid content of about 10, 20, 30, 40, 50, 60, or 70 parts by weight per 100 parts by weight of the sol-gel composition, where any value may form an upper end point or a lower end point, as appropriate.

In embodiments in which a plurality of sol-gel compositions are used (e.g., a sol-gel composition not containing a corrosion inhibiting material and/or one or more sol-gel compositions each containing a different corrosion inhibiting material), process 200 may be performed a plurality of times to form each sol-gel composition. Alternatively, the sol-gel composition may be divided into two or more batches and block 214 may be performed for each desired CIM-containing sol-gel compositions using a respective corrosion inhibiting material.

Blocks 202-214 of process 200 may be performed in the order presented or in a different order and/or one or more blocks may be omitted in some embodiments. For example, blocks 210, 212, and 214 may be performed in a different order. Further, to form a sol-gel composition without a corrosion inhibiting material, block 214 is omitted.

Figure 3:
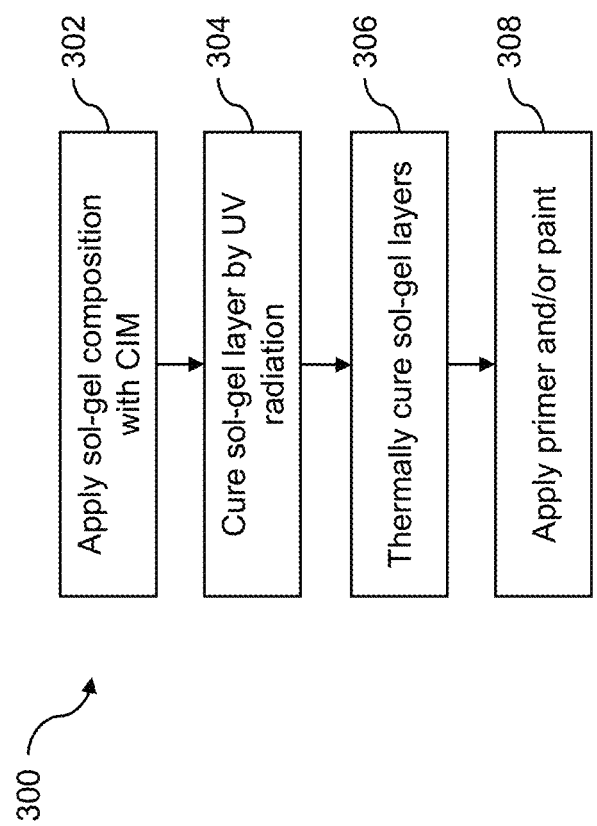
FIG. 3 illustrates an example process for forming a corrosion-resistant coating that includes a sol-gel layer with CIM on a substrate in accordance with an embodiment of the present disclosure.

FIG. 3 illustrates an example process 300 for forming a corrosion-resistant coating that includes a sol-gel layer (e.g., a sol-gel coating) on a substrate such as a panel (e.g., an aluminum substrate, an aluminum alloy substrate, or other substrate). A sol-gel composition is applied to a substrate, and the sol-gel composition is cured by UV light and/or thermally cured.

At block 302, a CIM-containing sol-gel composition prepared by process 200 of FIG. 2 is applied to a substrate. For example, the CIM-containing sol-gel composition is contacted with the substrate to form a CIM-containing sol-gel layer such as by dipping the substrate in the CIM-containing sol-gel composition, by immersing the substrate in the CIM-containing sol-gel composition, by spraying the CIM-containing sol-gel composition on the substrate, and/or by other methods of applying the CIM-containing sol-gel composition to the substrate. If dip coating is used, the CIM-containing sol-gel layer can be deposited using a withdrawals speed ranging from about 1 to about 15 mm/s (e.g., about 5 to about 12 mm/s, about 10 mm/s, or other withdrawal speed). The withdrawal speed may be about 1, 2, 3, 4, 5, 6, 7, 8, 9, 10, 11, 12, 13, 14, or 15 mm/s, where any value may form an upper end point or a lower end point, as appropriate.

At block 304, the CIM-containing sol-gel layer formed by block 302 is cured by UV radiation. For example, the UV radiation has a light dose ranging from about 500 to about 1000 mJ/cm$^2$. The UV radiation may have a light dose of about 500, 550, 600, 650, 700, 750, 800, 850, 900, 950, or 1000 mJ/cm$^2$, where any value may form an upper end point or a lower end point, as appropriate. The curing by UV radiation may be performed for a time period ranging from about 0.5 to about 30 min. The time period may be about 0.5, 1, 2, 3, 4, 5, 10, 15, 20, 25, or 30 min, where any value may form an upper end point or a lower end point, as appropriate.

At block 306, the sol-gel layer is thermally cured. For example, the sol-gel layer is thermally cured at a temperature ranging from about 70 to about 90° C. The sol-gel layer may be thermally cured at about 70, 75, 80, 85, or 90° C., where any value may form an upper end point or a lower end point, as appropriate. The thermal curing may be performed for a time period ranging from about 40 to about 120 minutes. The time period may be 40, 50, 60, 70, 80, 90, 100, 110, or 120 min, where any value may form an upper end point or a lower end point, as appropriate. In an example, the thermal curing is performed in a hot air circulated oven. Alternatively, or in addition to, thermal curing at a high temperature, the thermal curing includes exposing the sol-gel layer to infrared (IR) radiation, near IR radiation, and/or microwave radiation. For example, the sol-gel layer is exposed to IR and/or near IR radiation for a time period ranging from about 10 to about 60 min (e.g., 30 min or other time period). The time period of exposure to IR and/or near IR may be about 10, 15, 20, 25, 30, 35, 40, 45, 50, 55, or 60 min, where any value may form an upper end point or a lower end point, as appropriate.

At block 308, primer and/or paint is applied on the sol-gel layer of the substrate. For example, the primer is applied on the sol-gel layer, and the paint is applied on the primer. Advantageously, the cured sol-gel layer not only provides corrosion resistance to the substrate but also facilitates adherence of the primer and/or paint to the substrate.

Figure 4:
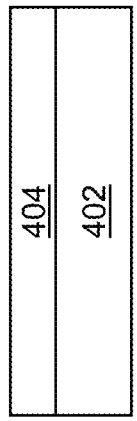
FIG. 4 illustrates a diagrammatic cross-sectional view of an example corrosion-resistant coating on a substrate in accordance with an embodiment of the present disclosure.

FIG. 4 illustrates a diagrammatic cross-sectional view of an example corrosion-resistant coating on a substrate 402 formed, for example, by process 300 of FIG. 3. The corrosion-resistant coating includes a CIM-containing sol gel layer 404 formed on substrate 402, CIM-containing sol gel layer 404 includes sol-gel composition and a corrosion inhibiting material. The corrosion inhibiting material includes a layered metal phosphate composition (e.g., a layered tetravalent phosphate composition) that provides nanocarriers of layered tetravalent metal phosphate, and a corrosion inhibitor intercalated in the nanocarriers of layered tetravalent metal phosphate.

In other embodiments, the corrosion-resistant coating includes a plurality of CIM-containing sol gel layers, one of which may be a CIM-containing sol gel layer formed from a sol-gel composition that contains a corrosion inhibitor-intercalated layered metal phosphate composition prepared according to process 200 of FIG. 2. One or more of the other sol gel layers may include a different corrosion inhibiting material such as a corrosion inhibitor-encapsulated layered double hydroxide (LDH) composition formed by a process 500 of FIG. 5, described further below. Further, at least one of the other sol gel layers may not include a corrosion inhibiting material.

Figure 5:
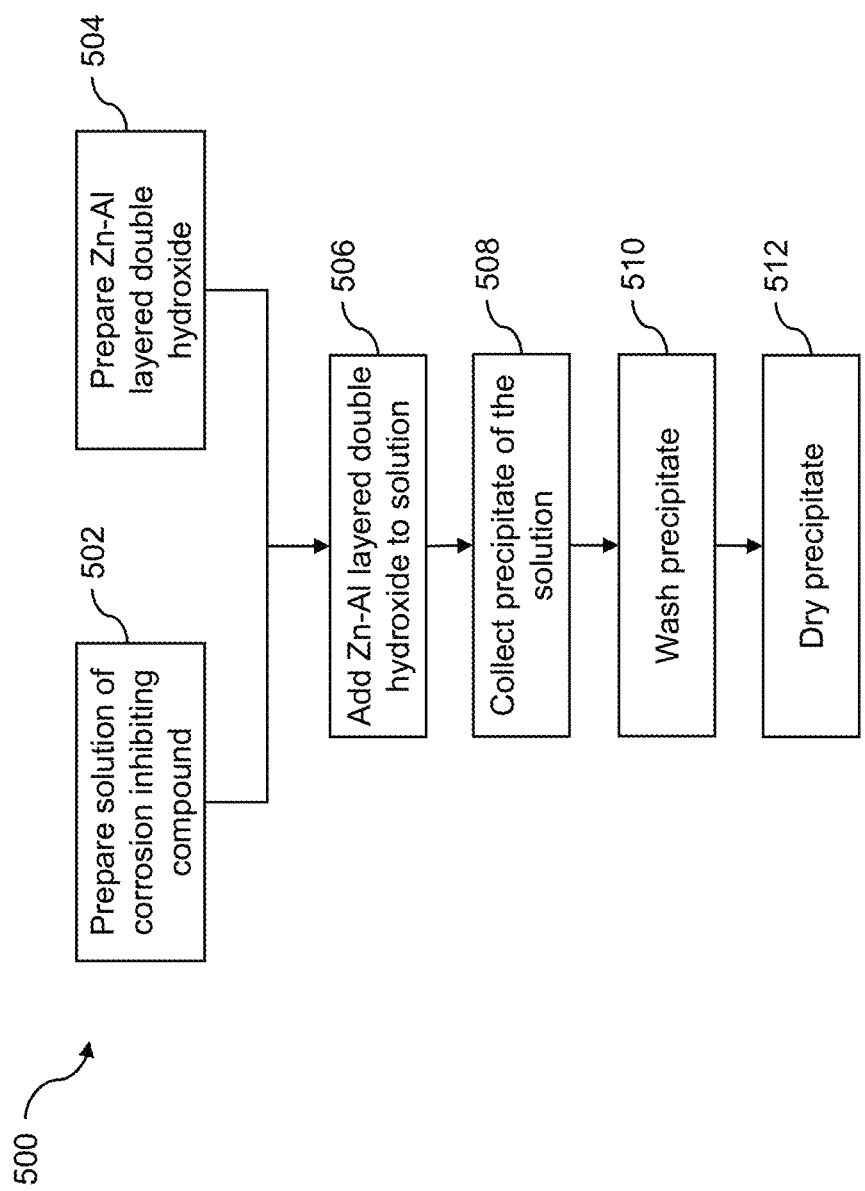
FIG. 5 illustrates an example process for preparing a corrosion inhibiting material that includes a corrosion inhibitor-intercalated LDH composition in accordance with an embodiment of the present disclosure.

FIG. 5 illustrates an example process 500 for preparing a corrosion inhibiting material that includes an LDH composition (e.g., a Zn—Al LDH composition) encapsulating one or more corrosion inhibitors. The corrosion inhibiting material may be an organic corrosion inhibiting material that includes one or more organic corrosion inhibitors, an inorganic corrosion inhibiting material that includes one or more organic corrosion inhibitors, or a combination corrosion inhibiting material that includes one or more organic corrosion inhibitors and one or more inorganic corrosion inhibitors.

At block 502, a solution of corrosion inhibitor is prepared. For example, an organic corrosion inhibitor is dissolved or dispersed in a solvent to form the solution. In another example, an inorganic corrosion inhibitor is dissolved in a solvent to form the solution. In a further example, an organic corrosion inhibitor and an inorganic corrosion inhibitor is dissolved in a solvent to form the solution.

In an aspect, the organic corrosion inhibitor is an imidazole, a triazole, a tetrazole, a thiazole, a thiadiazole, a benzimidazole, a benzotriazole, a benzothiazole, a quinoline, phytic acid, an organophosphonic acid, or an oil. The oil includes saturated and/or unsaturated fatty acids such as stearic acid, palmitic acid, oleic acid, linoleic acid, and/or linolenic acid.

Specific examples of the organic corrosion inhibitor include 1-(3-aminopropyl)imidazole, 1H-1,2,3-triazole, 4-methyl-4H-1,2,4-triazole-3-thiol, 1,2,4-triazole-3-carboxylic acid, 3-amino-1,2,4-triazole-5-thiol, 4H-1,2,4-triazol-4-amine, 3-mercapto-4-methyl-4H-1,2,4-triazole, 5-phenyl-1H-1,2,4-triazole-3-thiol, 1-methyl-1H-tetrazole-5-thiol, 1H-tetrazole-5-acetic acid, 4-methyl-1,3-thiazole-5-carboxylic acid, 1,3,4-thiadiazole-2,5-dithiol, 1H-benzimidazole-2-carboxylic acid, 1H-benzotriazole (BTA), 2-mercaptobenzothiazole (MBT), 8-hydroxyquinoline, phytic acid, amino tris(methylenephosphonic acid) (ATMP), ethylenediamine tetra(methylenephosphonic acid) (EDTMP), 1-hydroxyethylidene-1,1-diphosphonic acid (HEDP), di ethylenetriamine penta(methylenephosphonic acid) (DTPMP), and a vegetable oil (e.g., linseed oil or other vegetable oil).

In an aspect, the inorganic corrosion inhibitor is a salt of an oxyanion of a transition metal, a post-transition metal, a metalloid, or a polyatomic non-metal. In another aspect, the inorganic corrosion inhibitor is a vanadate, a molybdate, a tungstate, a phosphate, a manganate, a permanganate, or an aluminate.

Specific examples of the inorganic corrosion inhibitor include sodium metavanadate, potassium permanganate, sodium molybdate, and sodium tungstate.

At block 504, a Zn—Al LDH composition is prepared. For example, the Zn—Al LDH compound may be prepared by a process 600 of FIG. 6.

At block 506, the Zn—Al LDH composition is added to the solution of the corrosion inhibitor. For example, the Zn—Al LDH composition in an amount ranging from about 5 to about 100 g per 1 L of the solution is added to the solution with stirring and stirring is continued for a time period ranging from 3 to about 48 h. The amount of the Zn—Al LDH composition may be 5, 10, 15, 20, 25, 30, 35, 40, 45, 50, 55, 60, 65, 70, 75, 80, 85, 90, 95, or 100 g per 1 L of the solution, where any value may form an upper end point or a lower end point, as appropriate. The time period may be about 3, 6, 9, 12, 15, 18, 21, 24, 27, 30, 33, 36, 39, 42, 45, or 48 h, where any value may form an upper end point or a lower end point, as appropriate. A corrosion inhibitor encapsulated LDH precipitate is formed as a result of block 506. The Zn—Al LDH is intercalated with the corrosion inhibitor such that the Zn—Al LDH composition functions as nanocontainers that encapsulate the corrosion inhibitor.

At block 508, the precipitate of the solution of the corrosion inhibitor is collected, for example, by centrifugation. The precipitate is washed at block 510 and dried at block 512 to form the corrosion inhibiting material. For example, the precipitate is washed with hot water until the pH of the supernatant is neutral, and then dried in a drying oven. The corrosion inhibiting material includes a corrosion inhibitor-exchanged Zn—Al LDH composition (also referred to as a corrosion inhibitor-incorporated Zn—Al LDH composition, a corrosion inhibitor-intercalated Zn—Al LDH composition or a corrosion inhibitor-encapsulated Zn—Al LDH composition).

If an organic corrosion inhibitor is used in block 502, the corrosion inhibiting material is an organic corrosion inhibiting material that includes the organic corrosion inhibitor encapsulated in the Zn—Al LDH composition. If an inorganic corrosion inhibitor is used in block 502, the corrosion inhibiting material is an organic corrosion inhibiting material that includes the organic corrosion inhibitor encapsulated in the Zn—Al LDH composition. Accordingly, in embodiments in which both an inorganic corrosion inhibiting material and an organic corrosion inhibiting material are desired, process 500 may be performed twice, once using an organic corrosion inhibitor at block 102 and once using an inorganic corrosion inhibitor at block 502.

In some embodiments, a combination corrosion inhibiting material that includes the Zn—Al LDH composition encapsulating both an organic corrosion inhibitor and an inorganic corrosion inhibitor may be formed by mixing an organic corrosion inhibiting material and an inorganic corrosion inhibitor each prepared by respective process 500, or by preparing a solution including both types of corrosion inhibitors at block 502 in one process 500.

FIG. 6 illustrates an example process 600 for preparing a Zn—Al LDH composition. For example, block 504 of FIG. 5 may be performed by process 600.

At block 602, a solution of a zinc salt (e.g., zinc nitrate or other zinc salt) and a solution of aluminum salt (e.g., aluminum nitrate or other aluminum salt) is mixed to form a solution of zinc and aluminum. For example, zinc nitrate is dissolved in a solvent, aluminum nitrate is dissolved in a solvent, and the zinc nitrate solution and the aluminum solution is mixed and stirred under nitrogen purging to form the solution of zinc and aluminum, also referred to as a mixture.

At block 604, a solution of an alkali metal salt such as a sodium salt (e.g., sodium nitrate or other sodium salt) is added to the mixture. For example, a solution of sodium nitrate is added drop-wise to the mixture while maintaining a pH ranging from about 8 to about 11 using a base solution (e.g., a 2.0 M sodium hydroxide solution or other base solution). The maintained pH may be about 8, 8.5, 9, 9.5, 10, 10.5, or 11, where any value may form an upper end point or a lower end point, as appropriate. A fluffy white precipitate is formed in the resulting mixture. Once the addition of the sodium nitrate solution is complete, at block 606, the mixture is stirred vigorously under nitrogen purging for a time period ranging from about 3 to 24 h. The time period may be about 3, 6, 9, 12, 15, 18, 21, or 24 h, where any value may form an upper end point or a lower end point, as appropriate.

At block 608, the precipitate of the mixture is collected, for example, by centrifugation. The precipitate is washed at block 610 and dried at block 612 to form the Zn—Al LDH composition. For example, the precipitate is washed with hot water and then dried in a drying oven.

FIG. 7 illustrates an example process 700 for forming a corrosion-resistant coating that includes one or more sol-gel layers (e.g., one or more sol-gel coatings) on a substrate such as a panel (e.g., an aluminum substrate, an aluminum alloy substrate, or other substrate). One or more layers of the sol-gel composition are applied to a substrate, each of the one or more layers is cured by UV light, and then the one or more layers of the sol-gel composition are thermally cured.

At block 702, a first sol-gel composition prepared by process 200 of FIG. 2 (e.g., a CIM-containing compound with a corrosion inhibitor-encapsulated layered metal phosphate composition, a CIM-containing compound with a corrosion inhibitor-encapsulated Zn—Al LDH composition, or a sol-gel composition without a corrosion inhibiting material) is applied to a substrate. For example, the first sol-gel composition is contacted with the substrate to form a sol-gel layer such as by dipping the substrate in the first sol-gel composition, by immersing the substrate in the first sol-gel composition, by spraying the first sol-gel composition on the substrate, and/or by other methods of applying the first sol-gel composition to the substrate. If dip coating is used, the sol-gel layer can be deposited using a withdrawals speed ranging from about 1 to about 15 mm/s (e.g., about 5 to about 12 mm/s, about 10 mm/s, or other withdrawal speed). The withdrawal speed may be about 1, 2, 3, 4, 5, 6, 7, 8, 9, 10, 11, 12, 13, 14, or 15 mm/s, where any value may form an upper end point or a lower end point, as appropriate.

At block 704, the sol-gel layer formed by block 702 is cured by UV radiation. For example, the UV radiation has a light dose ranging from about 500 to about 1000 mJ/cm$^2$. The UV radiation may have a light dose of about 500, 550, 600, 650, 700, 750, 800, 850, 900, 950, or 1000 mJ/cm$^2$, where any value may form an upper end point or a lower end point, as appropriate. The curing by UV radiation may be performed for a time period ranging from about 0.5 to about 30 min. The time period may be about 0.5, 1, 2, 3, 4, 5, 10, 15, 20, 25, or 30 min, where any value may form an upper end point or a lower end point, as appropriate.

At block 706, a second sol-gel composition prepared by process 200 of FIG. 2 (e.g., a CIM-containing compound with a corrosion inhibitor-encapsulated layered metal phosphate composition, a CIM-containing compound with a corrosion inhibitor-encapsulated Zn—Al LDH composition, or a sol-gel composition without a corrosion inhibiting material) is applied to the substrate (e.g., on a previously formed sol gel layer on the substrate). For example, the second sol-gel composition is contacted with the substrate to form a sol-gel layer such as by dipping the substrate in the second sol-gel composition, by immersing the substrate in the second sol-gel composition, by spraying the second sol-gel composition on the substrate, and/or by other methods of applying the second sol-gel composition to the substrate. If dip coating is used, the second sol-gel layer can be deposited using a withdrawals speed ranging from about 1 to about 15 mm/s (e.g., about 5 to about 12 mm/s, about 10 mm/s, or other withdrawal speed). The withdrawal speed may be about 1, 2, 3, 4, 5, 6, 7, 8, 9, 10, 11, 12, 13, 14, or 15 mm/s, where any value may form an upper end point or a lower end point, as appropriate.

At block 708, the sol-gel layer formed by block 706 is cured by UV radiation. For example, the UV radiation has a light dose ranging from about 500 to about 1000 mJ/cm$^2$. The UV radiation may have a light dose of about 500, 550, 600, 650, 700, 750, 800, 850, 900, 950, or 1000 mJ/cm$^2$, where any value may form an upper end point or a lower end point, as appropriate. The curing by UV radiation may be performed for a time period ranging from about 0.5 to about 30 min. The time period may be about 0.5, 1, 2, 3, 4, 5, 10, 15, 20, 25, or 30 min, where any value may form an upper end point or a lower end point, as appropriate.

In some embodiments, blocks 706-708 are repeated to form one or more additional sol-gel layers. Blocks 706-708 may be repeated with the same or different type of sol-gel composition until the desired sol-gel layers are formed. In some embodiments, block 704 and/or 708 may be omitted for at least one of the sol-gel layers (e.g., at least one of the sol-gel layers may be air dried or thermally cured instead of curing using UV radiation). For example, curing using UV radiation may be omitted for the final, top-most sol-gel layer among the desired sol-gel layers. At least one of the sol-gel layers are formed from the CIM-containing sol-gel layer with the corrosion inhibitor-encapsulated layered metal phosphate composition.

At block 710, the sol-gel layers are thermally cured. For example, the multiple sol-gel layers are thermally cured at a temperature ranging from about 70 to about 90° C. The multiple sol-gel layers may be thermally cured at about 70, 75, 80, 85, or 90° C., where any value may form an upper end point or a lower end point, as appropriate. The thermal curing may be performed for a time period ranging from about 40 to about 120 minutes. The time period may be 40, 50, 60, 70, 80, 90, 100, 110, or 120 min, where any value may form an upper end point or a lower end point, as appropriate. In an example, the thermal curing is performed in a hot air circulated oven. Alternatively, or in addition to, thermal curing at a high temperature, the thermal curing includes exposing the sol-gel layers to infrared (IR) radiation, near IR radiation, and/or microwave radiation. For example, the sol-gel layers are exposed to IR and/or near IR radiation for a time period ranging from about 10 to about 60 min (e.g., 30 min or other time period). The time period of exposure to IR and/or near IR may be about 10, 15, 20, 25, 30, 35, 40, 45, 50, 55, or 60 min, where any value may form an upper end point or a lower end point, as appropriate.

At block 712, primer and/or paint is applied on the sol-gel layers of the substrate. For example, the primer is applied on the top-most sol-gel layer, and the paint is applied on the primer. Advantageously, the cured sol-gel layers not only provide corrosion resistance to the substrate but also facilitate adherence of the primer and/or paint to the substrate.

FIGS. 8A-F illustrate diagrammatic cross-sectional views of example corrosion-resistant coatings that include a plurality of sol-gel layers formed on substrates 800, 810, 820, 830, 840, 850 by process 700 of FIG. 7. FIG. 8A shows a corrosion-resistant coating that includes a sol-gel layer 802 containing a corrosion inhibitor intercalated in a layered zirconium phosphate (Zr—P) composition formed on substrate 800, and a sol-gel layer 804 containing a corrosion inhibitor intercalated in a Zn—Al LDH composition formed on sol-gel layer 802. FIG. 8B shows a corrosion-resistant coating that includes a sol-gel layer 812 containing a corrosion inhibitor intercalated in a Zn—Al LDH composition formed on substrate 810, and a sol-gel layer 814 containing a corrosion inhibitor intercalated in a layered zirconium phosphate composition formed on sol-gel layer 812.

FIG. 8C shows a corrosion-resistant coating that includes a sol-gel layer 822 containing a corrosion inhibitor intercalated in a layered zirconium phosphate composition formed on substrate 820, and a sol-gel layer 824 containing the same or a different corrosion inhibitor intercalated in a layered zirconium phosphate composition formed on sol-gel layer 822. FIG. 8D shows a corrosion-resistant coating that includes a sol-gel layer 832 that does not contain a corrosion inhibitor formed on substrate 830, and a sol-gel layer 834 containing a corrosion inhibitor intercalated in a layered zirconium phosphate composition formed on sol-gel layer 832.

FIG. 8E shows a corrosion-resistant coating that includes a sol-gel layer 842 containing a corrosion inhibitor intercalated in a layered zirconium phosphate composition formed on substrate 840, and a sol-gel layer 844 that does not contain a corrosion inhibitor formed on sol-gel layer 842. FIG. 8F shows a corrosion-resistant coating that includes a sol-gel layer 852 that does not contain a corrosion inhibitor formed on substrate 850, a sol-gel layer 854 containing a corrosion inhibitor intercalated in a layered zirconium phosphate composition formed on sol-gel layer 852, and a sol-gel layer 856 that does not contain a corrosion inhibitor formed on sol-gel layer 854.

The following examples are provided to illustrate certain aspects of the processes and formulations relating to sol-gel coatings, and are not intended to limit the invention in any manner.

Example 1

Figure 9:
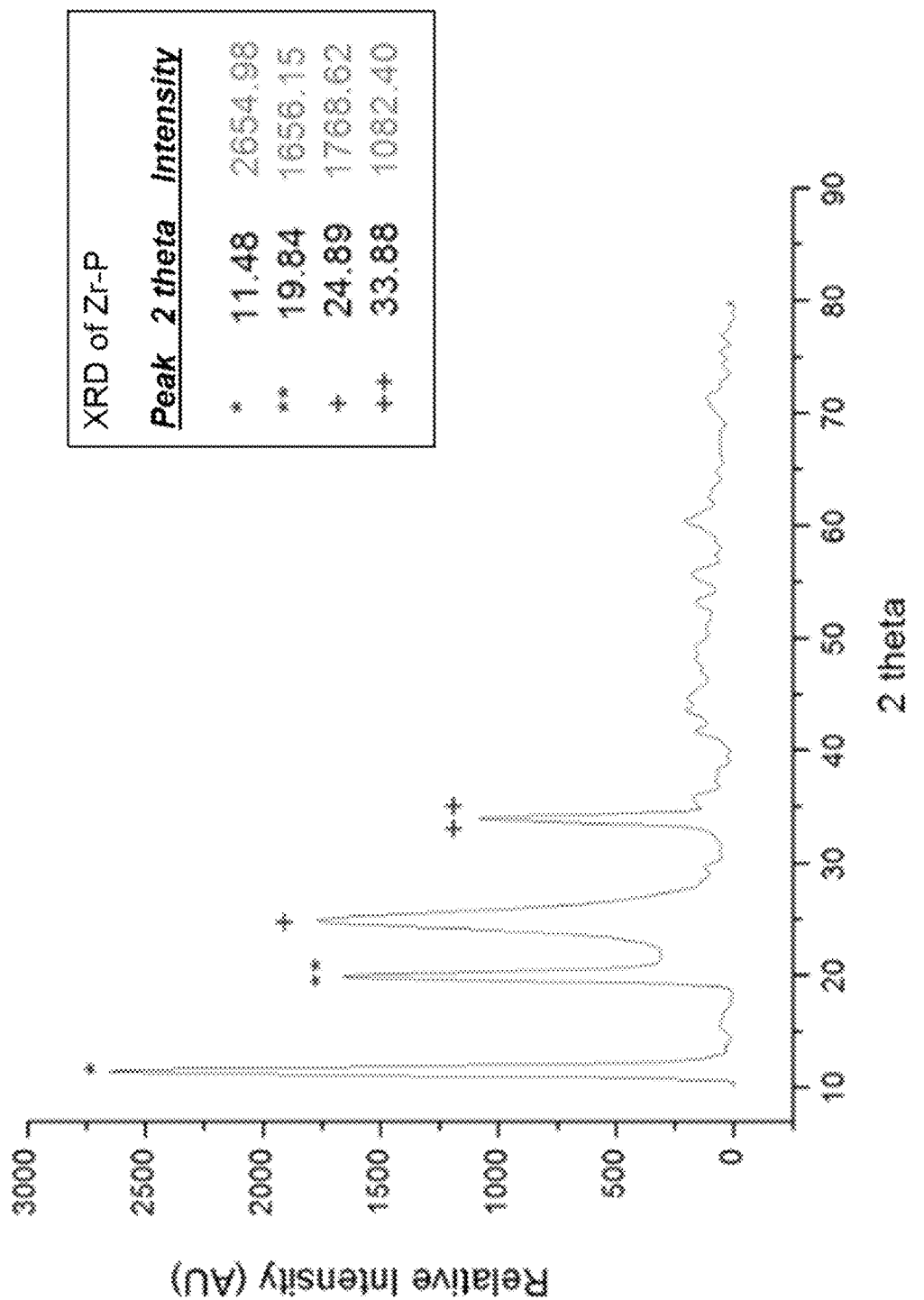
FIG. 9 shows an X-ray powder diffraction (XRD) pattern of an α-zirconium phosphate composition that may be used in the process of FIG. 1.
Figure 10B:
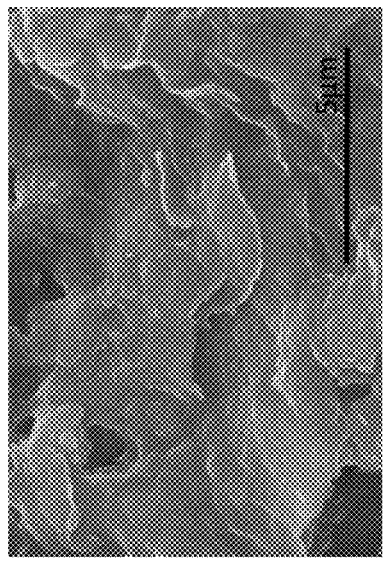
FIG. 10A and FIG. 10B show scanning electron microscope (SEM) images of an α-zirconium phosphate composition that may be used in the process of FIG. 1 at low magnification and at high magnification, respectively, illustrating the layered sheet like structure of the α-zirconium phosphate composition.
Figure 10A:
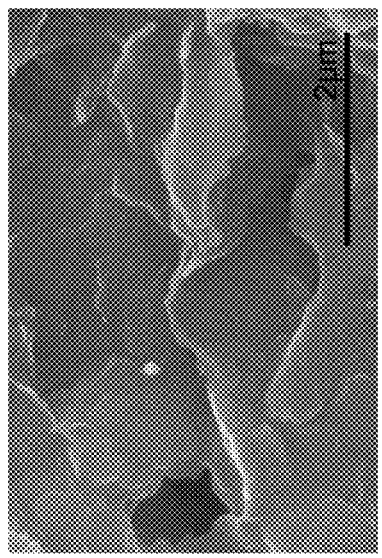

An α-zirconium phosphate composition was formed. A zirconyl chloride ($ZrOCl_2 \cdot 8H_2O$) solution having a concentration of about 0.05 M in the amount of about 120 ml was mixed with a phosphoric acid ($H_3PO_4$) solution having a concentration of about 6 M in the amount of about 85 ml was mixed with constant stirring at about 94° C. for about 48 h. The precipitate was centrifuged and washed repeatedly with water to form a powder of α-zirconium phosphate. FIG. 9 shows an X-ray powder diffraction (XRD) pattern of the α-zirconium phosphate. FIG. 10A and FIG. 10B show scanning electron microscope (SEM) images of the α-zirconium phosphate at low magnification and at high magnification, respectively, illustrating the layered sheet like structure of the α-zirconium phosphate.

Example 2

A sol-gel composition was prepared according to process 200 of FIG. 2. Composition A was synthesized by mixing about 171.5 g of 3-methacryloxypropyltrimethoxysilane and about 17.0 g of water in a glass jar loaded on a magnetic stirrer. About 5.5 grams of 0.1 N HCl was further added to the mixture. The solution was stirred in an ice bath till the solution turned transparent. Although 3-methacryloxypropyltrimethoxysilane was used in this example, one or more other alkoxysilanes of Formula IV may be used in place of, or in addition to, 3-methacryloxypropyltrimethoxysilane in other examples. Also, although HCl was used in this example, one or more other inorganic acids may be used in place of, or in addition to, HCl in other examples.

Composition B was synthesized by mixing about 11.8 g of methacrylic acid and about 45.2 g of zirconium n-propoxide under vigorous stirring. Stirring was continued for about 2 h. Although zirconium n-propoxide was used in this example, one or more other zirconium alkoxides of Formula V may be used in place of, or in addition to, zirconium n-propoxide in other examples.

Composition B was added to composition A under vigorous stirring to avoid agglomeration by placing the mixture in an ice bath, and the mixture was stirred for about 1 h. The jar containing the mixture was removed from the ice bath and stirred at room temperature for at least 1 hour for the mixture to come to room temperature.

Then about 100 g of phenyltrimethoxysilane was added to the mixture of Composition A and Composition B and stirred for about 1 h, and then about 100 g of 3-aminopropyltrimethoxysilane was added and stirred for about 1 hour. After completion of the stirring with 3-aminopropyltrimethoxysilane, about 25 grams of 3-glycidoxypropyltrimethoxysilane was added. Finally, about 10 grams of methacrylic acid was added followed by about 4 g of 0.1 N HCl and stirred for a further duration of about 1 h. Although phenyltrimethoxysilane, 3-aminopropyltrimethoxysilane, and 3-glycidoxypropyltrimethoxysilane were used in this example, one or more other methoxysilanes of Formula VI may be used in place of, or in addition to, phenyltrimethoxysilane, 3-aminopropyltrimethoxysilane, and/or 3-glycidoxypropyltrimethoxysilane in other examples.

The resulting mixture was diluted with isopropanol in a weight ratio of about 1:1 and stirred for about 3 h at room temperature for aging. Although the mixture was stirred for about 3 h, the mixture may be aged for a different time period in other examples, such as stirring overnight. About 1 kg of sol-gel composition ready for coating application was formed. A photoinitiator, IRGACURE® 184, in the amount of about 2% by weight per 100% of the sol-gel composition (including the photoinitiator) was added and stirred for about 30 min. Although IRGACURE® 184 was used in this example, one or more other photoinitiators may be used in place of, or in addition to, IRGACURE® 184 in other examples. After adding IRGACURE® 184, the sol-gel composition was kept away from light to avoid the sol-gel composition from interacting with light. The solid content of the sol-gel composition was about 28 parts by weight per 100 parts by weight of the sol-gel composition (including the photoinitiator).

Example 3

A sol-gel composition that includes a layered α-zirconium phosphate composition (without a corrosion inhibitor intercalated) was prepared according to process 200 of FIG. 2A layered α-zirconium phosphate composition, prepared as described in Example 1, was added to a sol-gel composition prepared as described in Example 2. To add 5 parts by weight of the layered α-zirconium phosphate composition per 100 parts by weight of the solid content of the sol-gel composition, about 1.4 g of the layered α-zirconium phosphate composition was added per 100 g of the sol-gel composition and stirred overnight. Although the stirring was carried out overnight in this example, other time periods may be used in other examples (e.g., about 2 h may be sufficient for uniform dispersion).

Example 4

Figure 12:
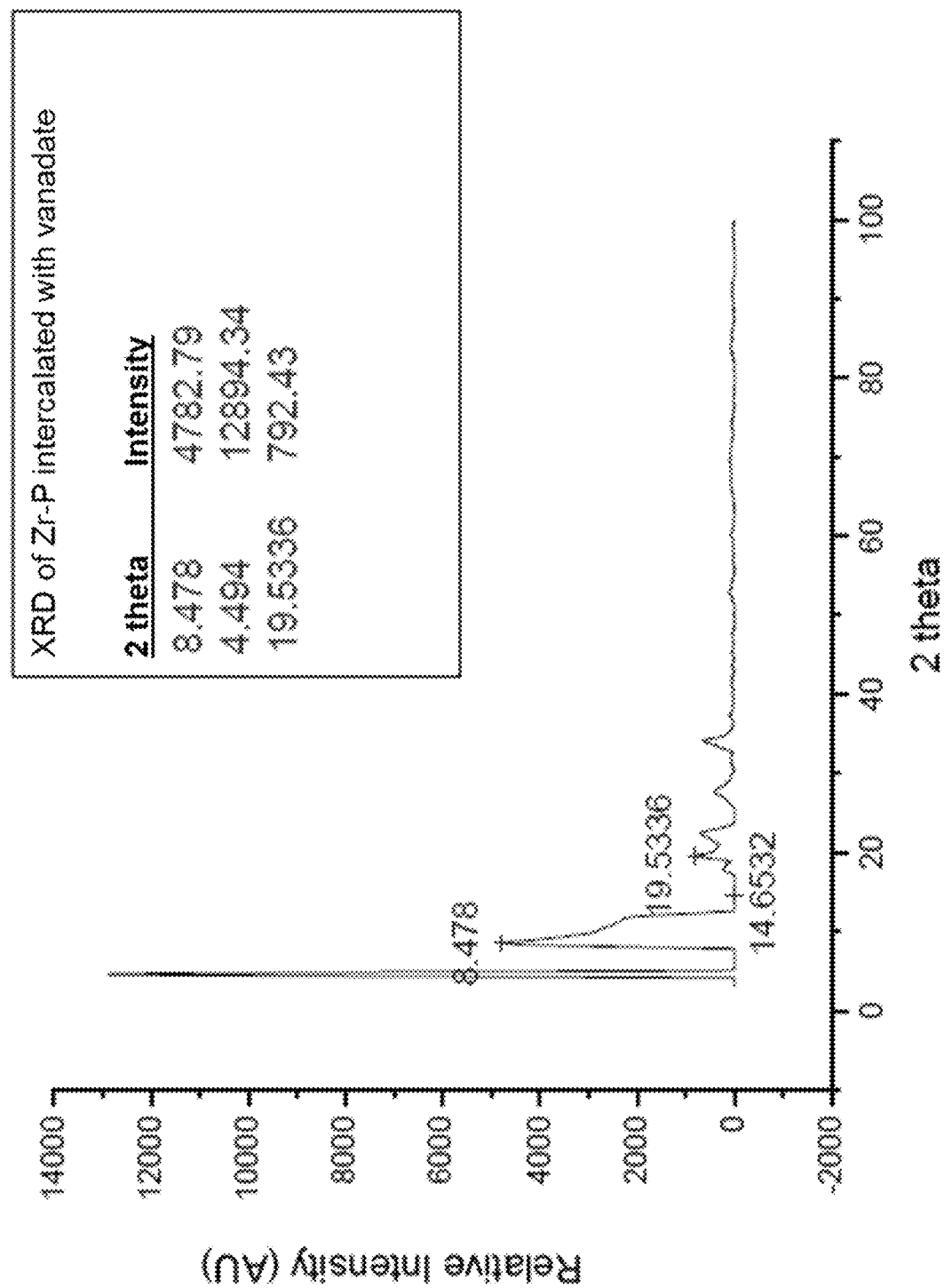
FIG. 12 shows an XRD pattern of the vanadate-intercalated layered α-zirconium phosphate prepared by the process of FIG. 1.

A corrosion inhibiting material including a vanadate-intercalated layered α-zirconium phosphate composition was prepared according to process 100 of FIG. 1. An α-zirconium phosphate composition, prepared as described in Example 1, in an amount of about 3 g and sodium metavanadate ($NaVO_3$) in an amount of about 1.292 g were added to about 325 ml of water and stirred for about 16 h. Although sodium metavanadate was used in this example, other corrosion inhibitors may be used in place of, or in addition to, sodium metavanadate in other examples. The resulting solution was centrifuged and the powder obtained was repeatedly washed with water until a neutral pH was obtained to form a vanadate-intercalated layered α-zirconium phosphate. FIG. 12 shows an XRD pattern of the vanadate-intercalated layered a α-zirconium phosphate.

Example 5

A sol-gel composition that includes a vanadate-intercalated layered α-zirconium phosphate composition was prepared according to process 200 of FIG. 2. A vanadate-intercalated layered α-zirconium phosphate composition, prepared as described in Example 4, was added as a corrosion inhibiting material to a sol-gel composition, prepared as described in Example 2, to form a CIM-containing sol-gel composition. Although the vanadate-intercalated layered α-zirconium phosphate composition was used in this example, other corrosion inhibiting materials may be used in other examples. To add 5 parts by weight of the corrosion inhibiting material per 100 parts by weight of the solid content of the sol-gel composition, about 1.4 g of the vanadate-intercalated layered α-zirconium phosphate composition was added per 100 g of the sol-gel composition and stirred overnight. Although the stirring was carried out overnight in this example, other time periods may be used in other examples (e.g., about 2 h may be sufficient for uniform dispersion).

Example 6

Figure 11:
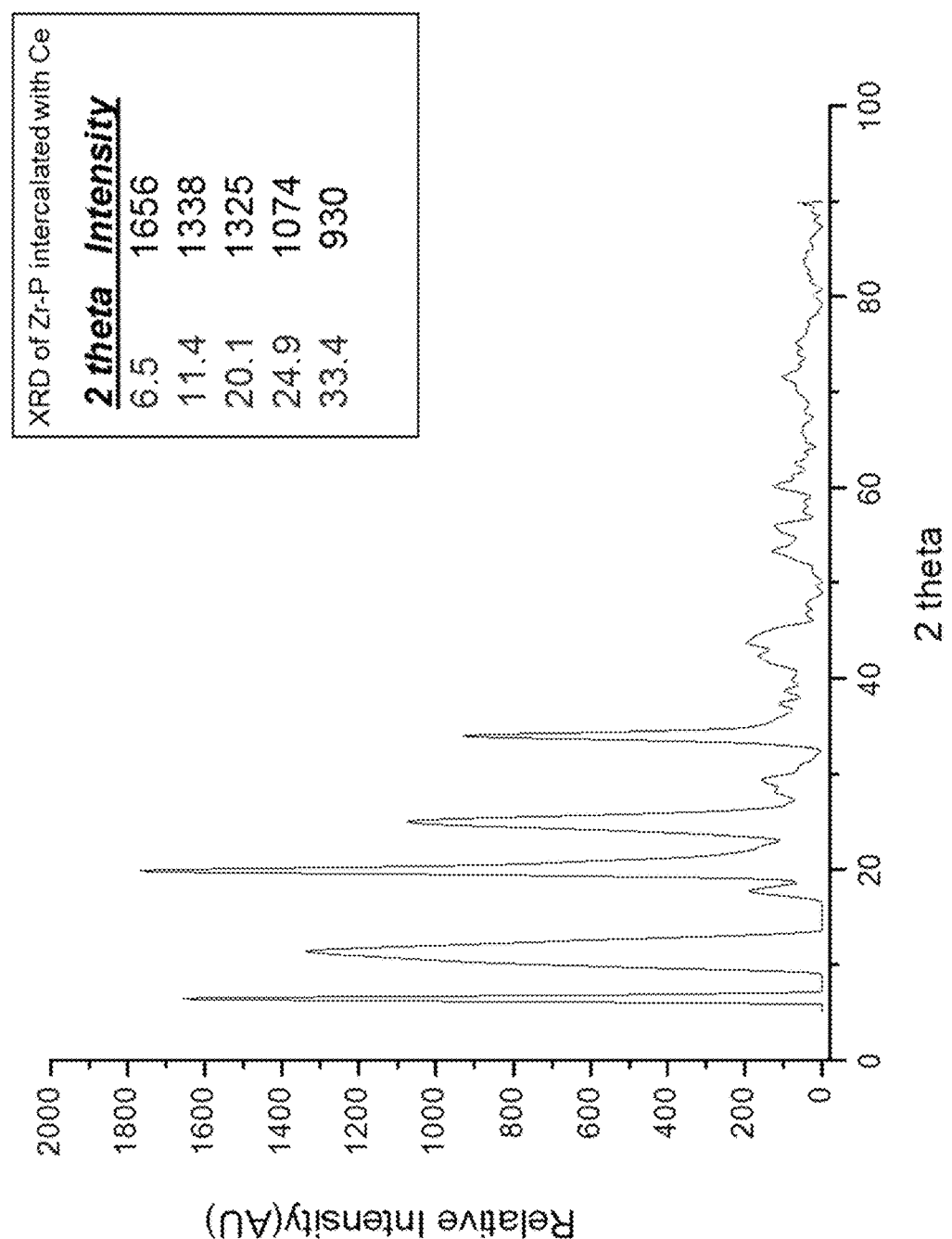
FIG. 11 shows an XRD pattern of a cerium-intercalated layered α-zirconium phosphate prepared by the process of FIG. 1.

A corrosion inhibiting material including a cerium-intercalated layered α-zirconium phosphate composition was prepared according to process 100 of FIG. 1. An α-zirconium phosphate composition, prepared as described in Example 1, in an amount of about 3 g and cerium nitrate hexahydrate ($Ce(NO_3)_3 \cdot 6H_2O$) in an amount of about 4.601 g were added to about 325 ml of water and stirred for about 16 h. Although cerium nitrate hexahydrate was used in this example, other corrosion inhibitors may be used in place of, or in addition to, cerium nitrate hexahydrate in other examples. The resulting solution was centrifuged and the powder obtained was repeatedly washed with water until a neutral pH was obtained to form a cerium-intercalated layered α-zirconium phosphate. FIG. 11 shows an XRD pattern of the cerium-intercalated layered α-zirconium phosphate.

Example 7

A sol-gel composition that includes a cerium-intercalated layered α-zirconium phosphate composition was prepared according to process 200 of FIG. 2. A cerium-intercalated layered α-zirconium phosphate composition, prepared as described in Example 6, was added as a corrosion inhibiting material to a sol-gel composition, prepared as described in Example 2, to form a CIM-containing sol-gel composition. Although the cerium-intercalated layered α-zirconium phosphate composition was used in this example, other corrosion inhibiting materials may be used in other examples. To add 5 parts by weight of the corrosion inhibiting material per 100 parts by weight of the solid content of the sol-gel composition, about 1.4 g of the cerium-intercalated layered α-zirconium phosphate composition was added per 100 g of the sol-gel composition and stirred overnight. Although the stirring was carried out overnight in this example, other time periods may be used in other examples (e.g., about 2 h may be sufficient for uniform dispersion).

Example 8

A Zn—Al LDH composition was formed according to process 600 of FIG. 6. A solution of about 104.1 g of zinc nitrate hexahydrate ($Zn(NO_3)_2 \cdot 6H_2O$) dissolved in about 25 ml water and a solution of about 65.6 g of aluminum nitrate nonahydrate ($Al(NO_3)_3 \cdot 9H_2O$) dissolved in about 25 ml water was mixed under vigorous stirring under $N_2$ purging. To this mixture, about 87.5 ml of a $NaNO_3$ solution having a concentration of about 0.1 M, adjusted to a pH of about 10, was added drop-wise and maintained at a pH of about 10 by adding a NaOH having a concentration of about 2.0 M. A fluffy LDH white precipitate was formed. Once the addition was complete, the entire mixture was stirred vigorously under $N_2$ purging for about 12 h. The precipitate was centrifuged at about 6500 rpm and washed about 3 or 4 times with hot water (at 80° C.), followed by drying at about 65° C. for about 24 h. A Zn—Al LDH composition in the form of a powder was formed.

Example 9

A corrosion inhibiting material including a vanadate-intercalated Zn—Al LDH composition was formed according to process 500 of FIG. 5. A sodium metavanadate solution having a concentration of about 0.1 M in the amount of about 400 ml was prepared. The pH of this solution was adjusted to a pH ranging from about 8 to about 9 by addition of a NaOH solution having a concentration of about 2.0 M. To this, about 10 g of a Zn—Al LDH composition, prepared as described in Example 8, was added with continuous stirring. Stirring was continued for about 24 h. The solution was then centrifuged to obtain a powder. The powder was washed with hot water until the pH of the supernatant was neutral, and followed by drying the vanadate-exchanged Zn—Al LDH composition at about 60° C. for a time period ranging from about 3 to about 4 h in a drying oven. Other corrosion inhibiting materials may be prepared using other organic corrosion inhibitors or inorganic corrosion inhibitors in other examples.

Example 10

A sol-gel composition that includes a vanadate-intercalated Zn—Al LDH composition was prepared according to process 200 of FIG. 2. A vanadate-intercalated Zn—Al LDH composition, prepared as described in Example 9, was added as a corrosion inhibiting material to a sol-gel composition, prepared as described in Example 2, to form a CIM-containing sol-gel composition. Although the vanadate-intercalated Zn—Al LDH composition was used in this example, other corrosion inhibiting materials may be used in other examples. To add 5 parts by weight of the corrosion inhibiting material per 100 parts by weight of the solid content of the sol-gel composition, about 1.4 g of the vanadate-intercalated Zn—Al LDH composition was added per 100 g of the sol-gel composition and stirred overnight. Although the stirring was carried out overnight in this example, other time periods may be used in other examples (e.g., about 2 h may be sufficient for uniform dispersion).

Example 11

A corrosion inhibiting material including a linseed oil-intercalated Zn—Al LDH composition was formed according to process 500 of FIG. 5. A Zn—Al LDH composition, prepared as described in Example 8, was added to a solution containing linseed oil with continuous stirring. Stirring was continued for about 24 h. The solution was then centrifuged to obtain a powder. The powder was washed with hot water until the pH of the supernatant was neutral, and followed by drying the linseed oil-exchanged Zn—Al LDH composition at about 60° C. for a time period ranging from about 3 to about 4 h in a drying oven. Other corrosion inhibiting materials may be prepared using other organic corrosion inhibitors or inorganic corrosion inhibitors in other examples.

Example 12

A sol-gel composition that includes a linseed oil-intercalated Zn—Al LDH composition was prepared according to process 200 of FIG. 2. A linseed oil-intercalated Zn—Al LDH composition, prepared as described in Example 11, was added as a corrosion inhibiting material to a sol-gel composition, prepared as described in Example 2, to form a CIM-containing sol-gel composition. Although the linseed oil-intercalated Zn—Al LDH composition was used in this example, other corrosion inhibiting materials may be used in other examples. To add 5 parts by weight of the corrosion inhibiting material per 100 parts by weight of the solid content of the sol-gel composition, about 1.4 g of the linseed oil-intercalated Zn—Al LDH composition was added per 100 g of the sol-gel composition and stirred overnight. Although the stirring was carried out overnight in this example, other time periods may be used in other examples (e.g., about 2 h may be sufficient for uniform dispersion).

Example 13

The following coated panels were generated by contacting each panel with respective sol-gel composition(s):

Panel 1: A single layer of a sol-gel composition containing a layered zirconium phosphate compound (without intercalated corrosion inhibitor) prepared as described in Example 3.

Panel 2: A single layer of a sol-gel composition containing a vanadate-intercalated layered zirconium phosphate composition prepared as described in Example 5.

Panel 3: A single layer of a sol-gel composition containing cerium-intercalated layered zirconium phosphate composition prepared as described in Example 7.

Panel 4: A double layer including a layer of a sol-gel composition containing layered zirconium phosphate (without intercalated corrosion inhibitor) prepared as described in Example 3, and a layer of a sol-gel composition containing a vanadate-intercalated LDH composition prepared as described in Example 10.

Panel 5: A double layer including a layer of a sol-gel composition containing vanadate-intercalated layered zirconium phosphate composition prepared as described in Example 5, and a layer of a sol-gel composition containing a vanadate-intercalated LDH composition prepared as described in Example 10.

Panel 6: A double layer including a layer of a sol-gel composition containing cerium-intercalated layered zirconium phosphate composition prepared as described in Example 7, and a layer of a sol-gel composition containing a vanadate-intercalated LDH composition prepared as described in Example 10.

Panel 7: A double layer including a layer of a sol-gel composition containing linseed oil-intercalated layered zirconium phosphate composition prepared as described in Example 12, and a layer of a sol-gel composition containing a vanadate-intercalated layered zirconium phosphate composition prepared as described in Example 5.

Panel 8: A double layer including a layer of a sol-gel composition containing linseed oil-intercalated layered zirconium phosphate composition prepared as described in Example 12, and a layer of a sol-gel composition containing a cerium-intercalated layered zirconium phosphate composition prepared as described in Example 7.

Each sol-gel layer was UV cured using a conveyorized UV curing unit. UV curing was performed using a conveyorized UV curing unit with three medium-pressure mercury lamps. The lamps (about 1 m long) provided an output of about 120 W/cm with a total wattage/lamp of about 12 kW. The belt speed was maintained at about 2 m/min during curing. The light dose as measured by a UV radiometer was about 871 mJ/cm$^2$ in the UV-C region. After UV curing each layer for about 5 minutes, the coated panel was subjected to thermal curing in an air circulated oven at about 80° C. for about an hour.

Example 14

Figure 13:
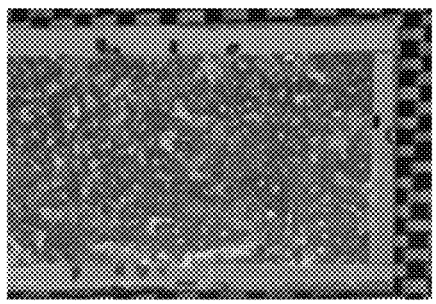
FIG. 13 is an image of an uncoated substrate after salt spray corrosion-resistance testing.

Each of Panels 1-8 of Example 13 was subjected to a salt spray test to test for corrosion, in which each panel was exposed to a 5% salt spray. An uncoated panel was also subject to the salt spray test. FIG. 13 shows a panel after about 336 h of the salt spray test, which showed severe corrosion. Coatings that included a corrosion inhibitor-intercalated layered zirconium phosphate compound as its corrosion inhibiting material performed better than coatings that included layered zirconium phosphate without an intercalated corrosion inhibitor. Further, the double layered coatings of Panels 4-8 performed better than the single layered coatings of Panels 1-3.

Figure 14A:
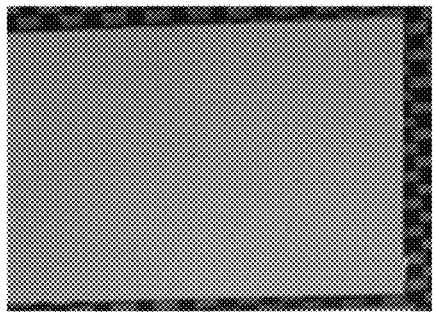
FIGS. 14A-B, 15A-B, 16A-B, 17A-B, and 18A-B show coated substrates formed by the process of FIG. 7 after salt spray corrosion-resistance testing.
Figure 14B:
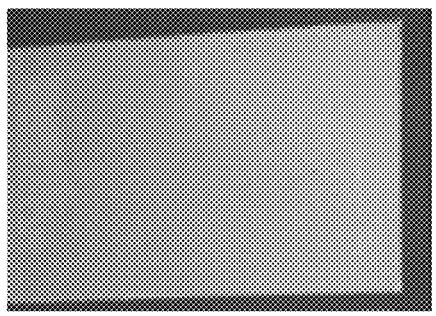

FIG. 14A and FIG. 14B show Panel 4 after about 168 h of the salt spray test and after about 336 h of the salt spray test, respectively.

Figure 15A:
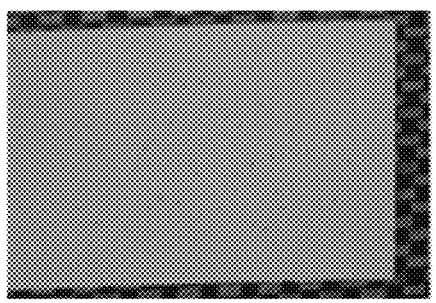
Figure 15B:
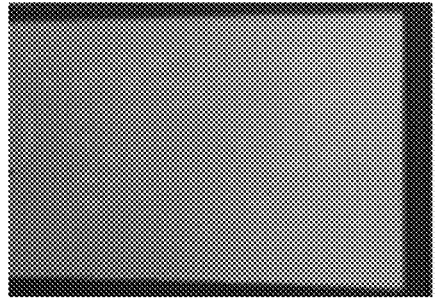

FIG. 15A and FIG. 15B show Panel 5 after about 168 h of the salt spray test and after about 336 h of the salt spray test, respectively.

Figure 16A:
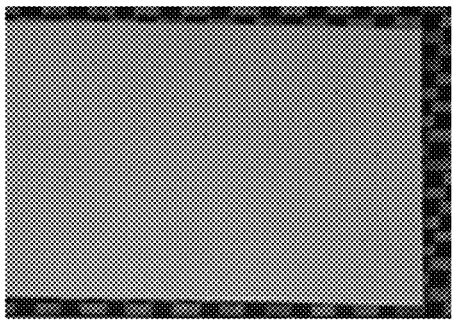
Figure 16B:
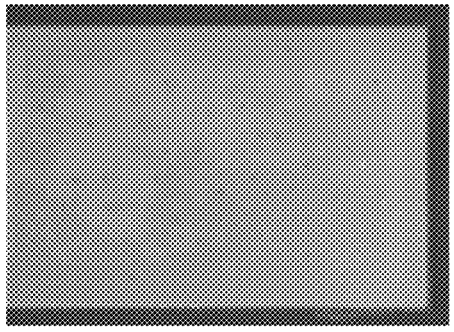

FIG. 16A and FIG. 16B show Panel 6 after about 168 h of the salt spray test and after about 336 h of the salt spray test, respectively.

Figure 17A:
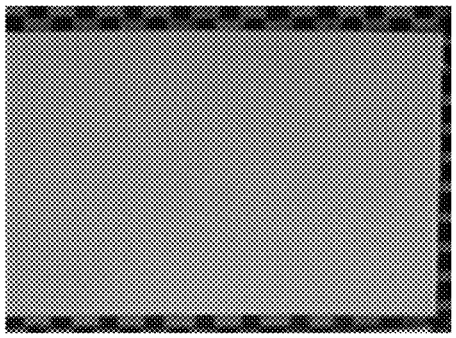
Figure 17B:
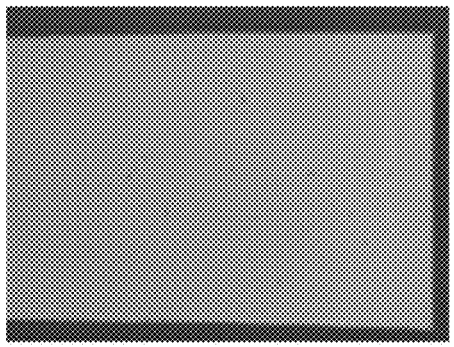

FIG. 17A and FIG. 17B show Panel 7 after about 168 h of the salt spray test and after about 336 h of the salt spray test, respectively.

Figure 18A:
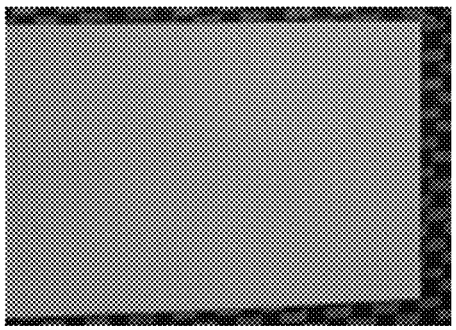
Figure 18B:
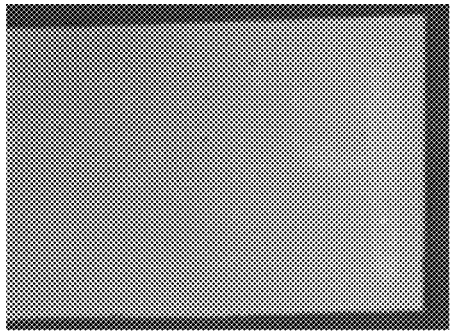

FIG. 18A and FIG. 18B show Panel 8 after about 168 h of the salt spray test and after about 336 h of the salt spray test, respectively.

Very few corrosion pits developed on Panels 4-8 as shown in these figures compared to the uncoated panel of FIG. 13. Among all the panels, Panels 7 and 8 were the most corrosion resistant, as they advantageously were pit-free up to 168 h and had very little pit density after 336 h.

When introducing elements of the present invention or exemplary aspects or embodiment(s) thereof, the articles "a," "an," "the," and "said" are intended to mean that there are one or more of the elements. The terms "comprising," "including," and "having" are intended to be inclusive and mean that there may be additional elements other than the listed elements. Although this invention has been described with respect to specific embodiments, the details of these embodiments are not to be construed as limitations. Different aspects, embodiments and features are defined in detail herein. Each aspect, embodiment or feature so defined may be combined with any other aspect(s), embodiment(s) or feature(s) (preferred, advantageous or otherwise) unless clearly indicated to the contrary. Accordingly, the scope of the invention is defined only by the following claims.

What is claimed is:

1. A method, comprising:
   dispersing a layered tetravalent metal phosphate composition and a first corrosion inhibitor in an aqueous solution and stirring to form a first solution, wherein the first corrosion inhibitor comprises cerium (III), a vanadate, a molybdate, a tungstate, a manganous, a manganate, a permanganate, an aluminate, a phosphonate, a thiazole, a triazole, an imidazole, or a combination thereof;
   collecting a precipitate of the first solution; and
   washing the precipitate of the first solution to form a first corrosion inhibiting material (CIM), the first CIM comprising the first corrosion inhibitor intercalated in the layered tetravalent metal phosphate composition.

2. The method of claim 1, further comprising:
   mixing a zirconyl chloride solution with a phosphoric acid solution and stirring to form a mixture;
   collecting a precipitate of the mixture; and
   washing the precipitate of the mixture to form the layered tetravalent metal phosphate composition.

3. The method of claim 1, further comprising:
adding the first CIM to a first sol-gel composition to form a first CIM-containing sol-gel composition.

4. The method of claim 3, further comprising:
contacting a first alkoxysilane with water and an inorganic acid to form a first composition;
contacting a zirconium alkoxide with a first organic acid to form a second composition;
contacting the first composition with the second composition to form a mixture;
contacting one or more second alkoxysilanes and a second organic acid with the mixture to form the first sol-gel composition, the first sol-gel composition having a ratio of a number of moles of silicon to a number of moles of zirconium ($n_{Si}/n_{Zr}$) ranging from about 2 to about 10;
adding a photoinitiator to the first sol-gel composition; and
diluting the first sol-gel composition with a solvent.

5. The method of claim 4, wherein the contacting to form the first composition comprises mixing an alkoxysilane having formula $R_A$—Si—$(R_B)_3$ with the water and the inorganic acid, wherein the $R_A$ is methacryloxyalkyl or glycidyloxyalkyl, and wherein the $R_B$ is a methoxy or ethoxy.

6. The method of claim 4, wherein the contacting to form the second composition comprises mixing a zirconium alkoxide having formula Zr—$(R_C)_4$ with methacrylic acid (MAA), and wherein the $R_C$ is ethoxy, n-propoxy, isopropoxy, n-butyloxy, or tert-butyloxy.

7. The method of claim 4, wherein the contacting to form the first sol-gel composition comprises:
adding the one or more second alkoxysilanes each having formula $R_D$—Si—$(R_E)_3$ to the mixture, wherein the $R_D$ is aryl, aminoalkyl, or glycidoxyalkyl, and wherein the $R_E$ is methoxy or ethoxy; and
adding MAA and stirring.

8. The method of claim 3, wherein the adding the first CIM comprises adding the first CIM in an amount ranging from about 1 to about 10 parts by weight per 100 parts by weight of the first sol-gel composition or ranging from about 1 to about 10 parts by weight per 100 parts by weight of a solid content of the first sol-gel composition.

9. The method of claim 3, further comprising:
applying the first CIM-containing sol-gel composition on a substrate, to form a CIM-containing sol-gel layer;
curing the CIM-containing sol-gel layer by UV radiation; and
thermally curing the CIM-containing sol-gel layer to form a corrosion-resistant coating.

10. The method of claim 3, further comprising:
dispersing a Zn—Al layered double hydroxide (LDH) composition and a second corrosion inhibitor in a solvent and stirring to form a second solution;
collecting a precipitate of the second solution;
washing the precipitate of the second solution to form a second CIM, the second corrosion inhibitor intercalated in the Zn—Al LDH composition; and
adding the second CIM to a second sol-gel composition to form a second CIM-containing sol-gel composition.

11. The method of claim 10, wherein the dispersing the second corrosion inhibitor comprises:
dispersing an organic corrosion inhibitor comprising 1-(3-aminopropyl)imidazole, 1H-1,2,3-triazole, 4-methyl-4H-1,2,4-triazole-3-thiol, 1,2,4-triazole-3-carboxylic acid, 3-amino-1,2,4-triazole-5-thiol, 4H-1,2,4-triazol-4-amine, 3-mercapto-4-methyl-4H-1,2,4-triazole, 5-phenyl-1H-1,2,4-triazole-3-thiol, 1-methyl-1H-tetrazole-5-thiol, 1H-tetrazole-5-acetic acid, 4-methyl-1,3-thiazole-5-carboxylic acid, 1,3,4-thiadiazole-2,5-dithiol, 1H-benzimidazole-2-carboxylic acid, 1H-benzotriazole (BTA), 2-mercaptobenzothiazole (MBT), 8-hydroxyquinoline, phytic acid, an organophosphonic acid, a vegetable oil, or a combination thereof; or
dispersing an inorganic corrosion inhibitor comprising a vanadate, a molybdate, a tungstate, a phosphate, a manganate, a permanganate, an aluminate, or a combination thereof.

12. The method of claim 10, further comprising:
applying the second CIM-containing sol-gel composition on a substrate, to form a first CIM-containing sol-gel layer;
curing the first CIM-containing sol-gel layer by UV radiation;
applying the first CIM-containing sol-gel composition on the substrate, to form a second CIM-containing sol-gel layer;
curing the second CIM-containing sol-gel layer by UV radiation; and
thermally curing a plurality of sol-gel layers comprising the first CIM-containing sol-gel layer and the second CIM-containing sol-gel layer to form a corrosion-resistant coating.

13. The method of claim 12, wherein:
the curing the first CIM-containing sol-gel layer and the second CIM-containing sol-gel layer by UV radiation comprises exposing a respective one of the sol-gel layers to UV radiation having a light dose ranging from about 500 to about 1000 $mJ/cm^2$ for a time period ranging from about 0.5 to 30 min; and
the thermally curing the plurality of sol-gel layers comprise exposing the plurality of sol-gel layers to infrared (IR) radiation, near IR radiation, microwave radiation, hot air having a temperature ranging from about 70 to about 90° C., or a combination thereof.

14. The method of claim 12, further comprising applying primer and/or paint on the plurality of sol-gel layers on the substrate, the plurality of sol-gel layers facilitating adherence of the primer or the paint to the substrate.

15. A method, comprising:
dispersing a layered tetravalent zirconium phosphate composition and a first corrosion inhibitor in an aqueous solution and stirring to form a first solution, wherein the first corrosion inhibitor comprises cerium (III), a vanadate, a molybdate, a tungstate, a manganous, a manganate, a permanganate, an aluminate, a phosphonate, a thiazole, a triazole, an imidazole, or a combination thereof;
collecting a precipitate of the first solution; and
washing the precipitate of the first solution to form a first corrosion inhibiting material (CIM), the first CIM comprising the first corrosion inhibitor intercalated in the layered tetravalent metal phosphate composition.

* * * * *

UNITED STATES PATENT AND TRADEMARK OFFICE
CERTIFICATE OF CORRECTION

PATENT NO. : 10,421,869 B2
APPLICATION NO. : 15/431506
DATED : September 24, 2019
INVENTOR(S) : Vijaykumar S. Ijeri et al.

It is certified that error appears in the above-identified patent and that said Letters Patent is hereby corrected as shown below:

In the Specification

In Column 6, Line 22, change "a α-Zirconium" to --a γ-Zirconium--

In Column 19, Line 12, change "($Ce(NO_3)_3)_3.6H2O$)" to --($Ce(NO_3)_3.6H2O$)--

Signed and Sealed this
Fifth Day of November, 2019

Andrei Iancu
*Director of the United States Patent and Trademark Office*